(12) United States Patent
Takamura et al.

(10) Patent No.: US 7,875,390 B2
(45) Date of Patent: Jan. 25, 2011

(54) ALKALINE BATTERY AND METHOD FOR PRODUCING THE SAME

(75) Inventors: Koshi Takamura, Osaka (JP); Harunari Shimamura, Osaka (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 11/600,872

(22) Filed: Nov. 17, 2006

(65) Prior Publication Data

US 2007/0117023 A1 May 24, 2007

(30) Foreign Application Priority Data

Nov. 22, 2005 (JP) .............................. 2005-336549

(51) Int. Cl.
*H01M 4/66* (2006.01)
(52) U.S. Cl. ........................ 429/245; 429/206; 429/523
(58) Field of Classification Search ................. 429/245, 429/206, 523
See application file for complete search history.

(56) References Cited

U.S. PATENT DOCUMENTS 6,723,469 B1 * 4/2004 Watanabe et al. ........... 429/231

2005/0003270 A1 * 1/2005 Phillips ....................... 429/223
2005/0106457 A1 * 5/2005 Richards et al. ............. 429/206

FOREIGN PATENT DOCUMENTS

| JP | 62123658 | * | 6/1987 |
| JP | 7-6759 | A | 1/1995 |
| JP | 10-334904 | A | 12/1998 |
| JP | 10-334906 | A | 12/1998 |

* cited by examiner

*Primary Examiner*—Jane Rhee
(74) *Attorney, Agent, or Firm*—McDermott Will & Emery LLP

(57) ABSTRACT

The storage characteristics of an alkaline battery are improved by suppressing the production of hydrogen gas during storage. The alkaline battery includes a positive electrode, a negative electrode, and a conductive member in contact with the negative electrode. The negative electrode includes a zinc-containing negative electrode active material and an alkaline electrolyte, and the alkaline electrolyte includes a potassium hydroxide aqueous solution. The negative electrode active material, the alkaline electrolyte, and a contact surface of the conductive member with the negative electrode include the same metal element M, and the metal element M is a metal element other than zinc.

10 Claims, 2 Drawing Sheets

ALKALINE BATTERY AND METHOD FOR PRODUCING THE SAME

FIELD OF THE INVENTION

The present invention relates to an alkaline battery with excellent storage characteristics in which the production of hydrogen gas inside the battery is suppressed.

BACKGROUND OF THE INVENTION

Common alkaline batteries include a potassium hydroxide aqueous solution as an alkaline electrolyte and particulate zinc as a negative electrode active material. However, zinc is susceptible to corrosion in the alkaline electrolyte. Thus, self-discharge reaction, i.e., dissolution of zinc from the zinc particle surface, occurs. When zinc dissolves, zinc ions and electrons are produced. On the zinc particle surface, the produced electrons react with protons in the electrolyte, thereby producing hydrogen gas. The hydrogen gas inside the battery increases the inner pressure of the battery, which may result in leakage of the alkaline electrolyte during storage.

The most effective method for suppressing the self-discharge of zinc is to use mercury for amalgamating zinc. Mercury is capable of completely covering the zinc particle surface and has a high hydrogen overvoltage. However, from the environmental consideration, other alternatives are currently used. A common alternative is a method of alloying zinc with other metal to improve its corrosion resistance. Examples of other metal include aluminum, calcium, bismuth, and indium. Another method is to dissolve zinc oxide or zinc hydroxide in an alkaline electrolyte to suppress the corrosion of zinc.

However, simply improving the corrosion resistance of zinc is not sufficient for reducing the production of hydrogen gas inside the battery. Hence, alkaline dry batteries are provided with a space into which hydrogen gas escapes, in order to suppress an increase in battery inner pressure due to the production of hydrogen gas.

To suppress the production of hydrogen gas inside the alkaline battery, Japanese Laid-Open Patent Publication No. Hei 7-6759 proposes coating the surface of a negative electrode current collector with a metal having a high hydrogen overvoltage. This publication also proposes adding an inhibitor to an electrolyte or a negative electrode active material. Japanese Laid-Open Patent Publication No. Hei 10-334904 and Japanese Laid-Open Patent Publication No. Hei 10-334906 propose using a zinc alloy containing bismuth, tin and the like and adding an inorganic inhibitor such as an indium oxide to the powder of the zinc alloy.

In the case of silver oxide batteries, a silver oxide, which is a positive electrode active material, catalyzes the oxidation of the hydrogen gas produced in the negative electrode to water, and this catalytic action slows the speed at which the hydrogen gas accumulates inside the battery. It is therefore possible to slow the increase of the battery inner pressure and prevent liquid leakage.

When the surface of a current collector is coated with a metal having a high hydrogen overvoltage, as proposed by JP No. Hei 7-6759, the production of hydrogen gas from the current collector surface is suppressed, but the production of hydrogen gas from the zinc alloy particles, which have a larger surface area than the current collector, cannot be suppressed. Hence, the production of hydrogen gas is not sufficiently suppressed.

Also, when an inorganic compound is added to an electrolyte or a negative electrode active material as an inhibitor, as proposed by JP No. Hei 7-6759, the so-called displacement plating reaction occurs on the zinc alloy particle surface. That is, the dissolution of zinc and the deposition of metal derived from the inorganic compound onto the particle surface occur simultaneously. At this time, on the zinc alloy particle surface, electrons are transferred to the protons in the electrolyte, so that the reaction of hydrogen gas production occurs competitively. As a result, the amount of hydrogen gas produced during an early stage of storage increases.

Further, when bismuth, tin and the like are contained in a zinc alloy and an inorganic inhibitor is added to the powder of the zinc alloy, as proposed by JP No. Hei 10-334904 and JP No. Hei 10-334906, the production of hydrogen gas is not sufficiently suppressed either.

Furthermore, due to the formation of a local battery between the negative electrode active material and the current collector, the dissolution reaction of zinc and the deposition reaction of metal on the negative electrode active material surface are promoted. Hence, the contact resistance between the negative electrode active material and the current collector increases and the internal resistance of the battery during storage significantly increases, thereby resulting in degradation of heavy load discharge performance, particularly pulse discharge characteristics.

When an organic compound is added as the inhibitor, the organic inhibitor covers the zinc alloy particle surface, thereby reducing the active site where hydrogen gas is produced and suppressing the production of hydrogen gas during an early stage of storage. The organic inhibitor covering the particle surface, however, interferes with the zinc reaction and therefore impairs the discharge characteristics. Further, the zinc alloy covered with the organic inhibitor is easily pulverized due to discharge, and if the organic inhibitor separates from the zinc alloy surface, it is unlikely to adsorb to the particle surface again. As a result, the amount of hydrogen gas produced from the particle surface increases as discharge proceeds.

As described above, when the displacement plating reaction occurs on the surface of the negative electrode active material or current collector, the reaction of hydrogen gas production occurs simultaneously, so that the amount of hydrogen gas produced during an early stage of storage increases. It is therefore desired to suppress the competitively-occurring hydrogen gas production reaction. Also, in order to suppress degradation of heavy load discharge characteristics, it is necessary to suppress an increase in the contact resistance between the negative electrode active material and the current collector.

Among alkaline batteries, button air batteries particularly have a difficulty in providing them with a space into which hydrogen gas escapes. If a space is provided inside the battery, the amount of negative electrode active material filled therein needs to be reduced, so that a sufficient discharge capacity cannot be obtained. As in silver oxide batteries, a button air battery may include a catalyst for oxidizing hydrogen gas to water in its positive electrode (air electrode), but the use of such a catalyst in the positive electrode results in a decrease in the positive electrode's ability to reduce oxygen and an increase in production costs.

In view of the above, the present invention intends to suppress the production of hydrogen gas inside a battery and to provide an alkaline battery that has excellent storage characteristics both when not used and when partially discharged.

BRIEF SUMMARY OF THE INVENTION

The present invention relates to an alkaline battery including a positive electrode, a negative electrode, and a conductive member in contact with the negative electrode. The negative electrode includes a zinc-containing negative electrode active material and an alkaline electrolyte, and the alkaline electrolyte includes a potassium hydroxide aqueous solution. The negative electrode active material, the alkaline electrolyte, and a contact surface of the conductive member with the negative electrode include the same metal element M, and the metal element M is a metal element other than zinc.

The negative electrode active material preferably comprises an alloy containing the metal element M and zinc.

Preferably, the alkaline electrolyte includes a potassium hydroxide aqueous solution and a solute dissolved in the potassium hydroxide aqueous solution, and the solute includes a zinc compound and a compound containing the metal element M.

The conductive member preferably includes a substance composed simply of the metal element M or an alloy containing the metal element M.

The contact surface of the conductive member with the negative electrode is preferably plated with the metal element M.

The metal element M preferably includes at least one selected from the group consisting of copper, tin, and indium.

The content of the metal element M in the alkaline electrolyte is preferably 0.0016 to 0.079% by weight.

The content of the metal element M in the negative electrode active material is preferably 0.0015 to 0.06% by weight.

Preferably, the solute further includes a lithium compound. The content of the lithium compound in the alkaline electrolyte is preferably 0.01 to 2% by weight.

Also, the present invention pertains to an alkaline dry battery including: a positive electrode case; a cylindrical positive electrode contained in the positive electrode case, the positive electrode having a hollow; a negative electrode filled in the hollow; and a negative electrode current collector inserted in the negative electrode. The negative electrode includes a zinc-containing negative electrode active material and an alkaline electrolyte, and the alkaline electrolyte includes a potassium hydroxide aqueous solution. The negative electrode active material, the alkaline electrolyte, and a surface of the negative electrode current collector include the same metal element M, and the metal element M is a metal element other than zinc.

Further, the present invention relates to an air zinc battery including: a negative electrode case; a negative electrode contained in the negative electrode case; and an air electrode opposing the negative electrode. The negative electrode includes a zinc-containing negative electrode active material and an alkaline electrolyte, and the alkaline electrolyte includes a potassium hydroxide aqueous solution. The negative electrode active material, the alkaline electrolyte, and a contact surface of the negative electrode case with the negative electrode include the same metal element M, and the metal element M is a metal element other than zinc.

Furthermore, the present invention is directed to a method for producing an alkaline battery. This method includes the steps of: preparing an alkaline electrolyte that includes a potassium hydroxide aqueous solution; preparing a negative electrode material mixture that includes a gelling agent and a negative electrode active material, the negative electrode active material containing zinc and a metal element M other than zinc; mixing the alkaline electrolyte with the negative electrode material mixture to obtain a gelled negative electrode; and bringing a conductive member including the metal element M into contact with the negative electrode. The step of preparing the alkaline electrolyte includes a step of mixing a potassium hydroxide aqueous solution with a solute to dissolve the solute. The solute includes a zinc compound and a compound containing the metal element M. Preferably, the solute further includes a lithium compound.

According to the present invention, because the negative electrode active material, the alkaline electrolyte, and the conductive member in contact with the negative electrode include the same metal element, the self-discharge of the negative electrode active material is sufficiently suppressed. Therefore, the production of hydrogen gas inside the battery can be suppressed effectively, compared with conventional methods. Also, it is possible to obtain an alkaline battery that has excellent storage characteristics both when not used and when partially discharged.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
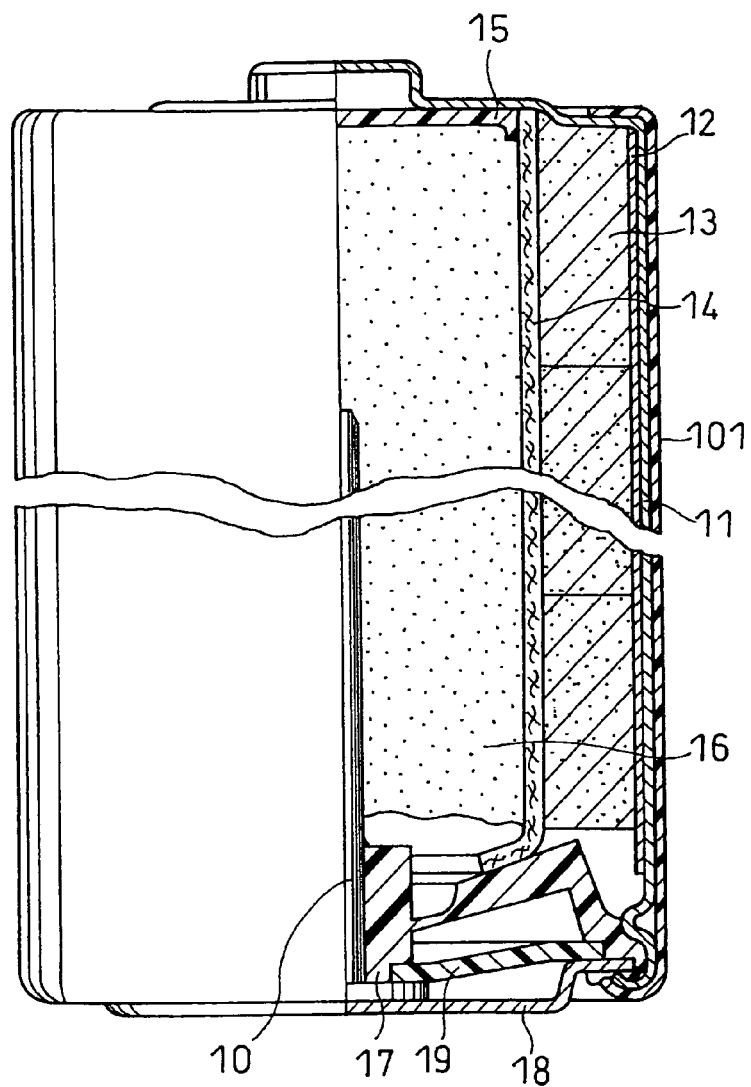
FIG. 1 illustrates a partial longitudinal section of an alkaline dry battery, which is an example of alkaline batteries of the present invention.

An alkaline battery of the present invention is characterized in that a negative electrode active material, an alkaline electrolyte, and a conductive member in contact with the negative electrode include the same metal element M that is a metal element other than zinc. With this configuration, when the alkaline battery is stored at room temperature for an extended period of time, the concentration of the metal element M ions in the alkaline electrolyte is constantly kept at a high level. This promotes the occurrence of the deposition reaction of the metal element M on the surface of the negative electrode active material and the contact surface of the conductive member with the negative electrode, thereby making it possible to suppress the competitively-occurring hydrogen gas production reaction.

The negative electrode active material preferably comprises an alloy containing the metal element M and zinc.

The metal element M contained in the negative electrode active material and the conductive member is a metal element other than zinc. The metal element M dissolves in the alkaline electrolyte as metal ions. Through displacement plating reaction, the metal ions are deposited as metal on the surface of the negative electrode active material and the conductive member. Simultaneously with the displacement plating reaction, the hydrogen gas production reaction occurs competitively. The speed of these reactions depends on the concentration of the metal ions in the alkaline electrolyte. A high metal ion concentration promotes the occurrence of the metal deposition reaction, while a low metal ion concentration promotes the occurrence of the hydrogen gas production reaction. In the present invention, since the metal element M included in the conductive member is included in both the alkaline electrolyte and the negative electrode active material, the metal ion concentration in the alkaline electrolyte is constantly kept high. Therefore, the hydrogen gas production reaction can be suppressed.

When the metal deposited on the surface of the negative electrode active material is the same as the metal contained in the conductive member, a local battery is unlikely to be formed between the negative electrode active material and the conductive member. This can suppress an increase in the contact resistance between the negative electrode active material and the conductive member and therefore degradation of heavy-load discharge performance, particularly degradation of pulse discharge characteristics.

The metal element M preferably comprises at least one selected from the group consisting of copper, tin, and indium. Due to their high hydrogen overvoltage, these metals can produce the good effect of suppressing hydrogen gas production when they are contained in the negative electrode active material and the conductive member. In view of the magnitude of hydrogen overvoltage and material costs, the use of tin is most preferred.

In the present invention, an "alkaline battery" particularly refers to an alkaline primary battery. Examples of alkaline primary batteries include alkaline dry batteries, air zinc batteries, nickel manganese dry batteries, nickel zinc batteries, silver oxide batteries, and nickel dry batteries.

In the present invention, a "conductive member" includes, for example, a negative electrode current collector for an alkaline dry battery and a negative electrode case for a button air zinc battery.

For example, the conductive member may be composed simply of the metal element M or may comprise an alloy or a compound containing the metal element M. Further, the conductive member may have a layer containing the metal element M (e.g., brass) on the surface (the contact surface with the negative electrode).

Exemplary methods for forming the layer containing the metal element M on the surface of the conductive member include plating and metal cladding. Among them, plating the conductive member is preferred. If the thickness of the plating is thin, the base material may be exposed under the plating during storage of the battery, thereby coming into contact with the alkaline electrolyte to produce hydrogen gas. Thus, the thickness of the plating is preferably 1 µm or more, and more preferably 1.5 µm to 5 µm. Exemplary methods of plating include electrolytic plating, electroless plating, and hot-dip plating. Among them, electrolytic plating or hot-dip plating is preferred. In view of the ease with which the thickness of the plating is controlled, the electrolytic plating is most preferred.

The negative electrode active material preferably comprises, for example, a zinc alloy containing the metal element M; or zinc or a zinc alloy plated with the metal element M. The zinc alloy may contain, for example, aluminum, bismuth, calcium, or lead, in addition to zinc and the metal element M. The zinc alloy is preferably in the form of a powder with a mean particle size of 30 µm to 400 µm. The negative electrode active material may contain trace amounts of unavoidable impurities. The negative electrode active material can be prepared, for example, by the following methods.

A first method is to dissolve the metal element M in molten zinc or a molten zinc alloy and make the alloy into powder form by atomization.

A second method is to deposit the metal element M on the surface of zinc or zinc alloy particles by displacement plating.

According to displacement plating, zinc or zinc alloy particles are immersed in an aqueous solution containing an ion species of the metal element M to deposit the metal element M on the particle surface as metal. As a result, the particles are plated with the metal element M. The surfaces of the particles plated with the metal element M have fewer active sites where hydrogen gas may be produced. It is therefore possible to reduce the amount of hydrogen gas production effectively.

The content of the metal element M in the negative electrode active material is preferably 0.0015 to 0.06% by weight. In this case, the amount of hydrogen gas produced due to the self-discharge of the negative electrode active material can be reduced. The more preferable content is 0.003 to 0.05% by weight. If the content of the metal element M in the negative electrode active material is too high, the metal element M may be unevenly distributed on the surfaces of the negative electrode active material particles. If the content is too low, the amount of the metal element M on the surfaces of the negative electrode active material particles may be insufficient.

The alkaline electrolyte comprises a potassium hydroxide aqueous solution and a solute dissolved in the potassium hydroxide aqueous solution. For example, the potassium hydroxide aqueous solution preferably contains 25 to 45% by weight of potassium hydroxide. The solute preferably includes a compound containing the metal element M.

Preferable examples of the compounds containing the metal element M include water-soluble copper compounds, water-soluble tin compounds, and water-soluble indium compounds. Examples of water-soluble copper compounds include copper sulfate and copper chloride. Examples of water-soluble tin compounds include stannous oxide, stannic oxide, potassium stannate, and sodium stannate. Among them, tetravalent tin compounds are preferable, and stannic oxide, potassium stannate, and sodium stannate are suitable. Examples of water-soluble indium compounds include indium oxide, indium hydroxide, indium sulfate, and indium chloride.

The content of the metal element M in the alkaline electrolyte is preferably 0.0016 to 0.079% by weight. In this case, the concentration of the metal element M in the alkaline electrolyte can be kept high and the hydrogen gas production reaction can be suppressed effectively. The more preferable concentration is 0.0039 to 0.063% by weight.

The solute contained in the alkaline electrolyte preferably includes a zinc compound. When the solute includes a zinc compound, the corrosion of zinc can be suppressed. Examples of zinc compounds include zinc oxide and zinc hydroxide. The zinc compound may be dissolved to saturation in the alkaline electrolyte, but the content of the zinc compound in the alkaline electrolyte is preferably 50 to 90% of the saturated concentration. The saturated concentration of the zinc compound, however, changes depending on the potassium hydroxide concentration of the alkaline electrolyte.

Preferably, the solute further includes lithium element. When the solute includes lithium element, the production of hydrogen gas can be suppressed effectively. Although the reason why the production of hydrogen gas is suppressed is not yet clear, it is probably as follows. Hydrogen gas is produced when the protons are supplied with electrons on the surfaces of the negative electrode active material particles. The alkaline electrolyte contains positively charged lithium ions, and some of them are present in the vicinity of the surfaces of the negative electrode active material particles. These positively charged lithium ions in the vicinity of the particle, surface interfere with the supply of electrons to the protons, thereby suppressing the production of hydrogen gas.

An alkaline electrolyte containing lithium element can be obtained, for example, by dissolving a lithium compound in an alkaline electrolyte. While the lithium compound is not particularly limited, it is preferably water-soluble. For example, a hydroxide or oxide of lithium may be used. The content of the lithium compound in the alkaline electrolyte is preferably 0.01 to 2% by weight. If the content is less than 0.01% by weight, the lithium ions can not sufficiently interfere with the supply of electrons to the protons on the surfaces of the negative electrode active material particles and hence may not sufficiently slow the speed at which hydrogen gas is produced. If the content is greater than 2% by weight, the lithium ions may interfere with the displacement plating reaction (i.e., the deposition of the metal element M on the surfaces of the negative electrode active material particles) and therefore may not sufficiently suppress the production of hydrogen gas. The content is more preferably 0.05 to 1.5% by weight. It has been confirmed that the use of sodium, calcium, or aluminum in place of lithium can also produce such effect of slowing the speed at which hydrogen gas is produced. This effect is believed to be related to the ion radius or the like.

An alkaline dry battery of the present invention includes, for example, a positive electrode case; a cylindrical positive electrode contained in the positive electrode case, the positive electrode having a hollow; a negative electrode filled in the hollow; and a negative electrode current collector inserted in the negative electrode. The negative electrode comprises a zinc-containing negative electrode active material and an alkaline electrolyte, and the alkaline electrolyte includes a potassium hydroxide aqueous solution. In this case, the negative electrode active material, the alkaline electrolyte, and a surface of the negative electrode current collector include the same metal element M, and the metal element M is a metal element other than zinc.

Referring now to FIG. 1, an alkaline dry battery is described. The alkaline dry battery includes hollow cylindrical positive electrode material mixture pellets 13 and a gelled negative electrode 16 filled in the hollow. A separator 14 is interposed between the positive electrode and the negative electrode. The inner face of a positive electrode case 11 has a nickel plating and a graphite coating film 12 on the nickel plating.

The alkaline dry battery is produced, for example, as follows.

First, a plurality of short cylindrical positive electrode material mixture pellets 13 are inserted into the positive electrode case 11, and the positive electrode material mixture pellets 13 are repressed in the positive electrode case 11. As a result, the positive electrode material mixture pellets 13 closely adhere to the inner face of the positive electrode case 11. Subsequently, the separator 14 and an insulating cap 15 are placed in the hollow of the positive electrode material mixture pellets 13.

Thereafter, an alkaline electrolyte is injected into the hollow in order to moisten the separator 14 and the positive electrode material mixture pellets 13. After the injection of the electrolyte, the gelled negative electrode 16 is filled in the hollow on the inner side of the separator 14.

Next, a negative electrode current collector (conductive member) 10 is inserted into the gelled negative electrode 16. The negative electrode current collector is integrated with a resin sealing plate 17, a bottom plate 18 serving as an external terminal, and an insulating washer 19. The open edge of the positive electrode case 11 is crimped onto the circumference of the bottom plate 18 with the edge of the resin sealing member 17 interposed therebetween, so that the opening of the positive electrode case 11 is sealed. Lastly, the outer surface of the positive electrode case 11 is covered with an outer label 101. In this way, an alkaline dry battery can be obtained.

The positive electrode of the alkaline dry battery may be any conventionally known one. For example, a positive electrode material mixture pellet obtained by mixing manganese dioxide (positive electrode active material) and an alkaline electrolyte with a mixer and molding the resulting particulate material into a hollow cylinder under pressure may be used as the positive electrode.

The gelling agent used to prepare a gelled negative electrode may be any conventionally known one. Such examples include polyacrylic acid and sodium polyacrylate.

The separator may also be any conventionally known one. Such examples include non-woven fabric comprising acetalized polyvinyl alcohol fiber and non-woven fabric comprising polyvinyl alcohol fiber and rayon fiber.

The alkaline battery of the present invention also encompasses an air zinc battery that includes a negative electrode case, a negative electrode contained in the negative electrode case, and an air electrode opposing the negative electrode. The negative electrode of the air zinc battery comprises a zinc-containing negative electrode active material and an alkaline electrolyte. The alkaline electrolyte includes a potassium hydroxide aqueous solution. In this case, the negative electrode active material, the alkaline electrolyte, and the contact surface of the negative electrode case with the negative electrode include the same metal element M, and the metal element M is a metal element other than zinc.

Figure 2:
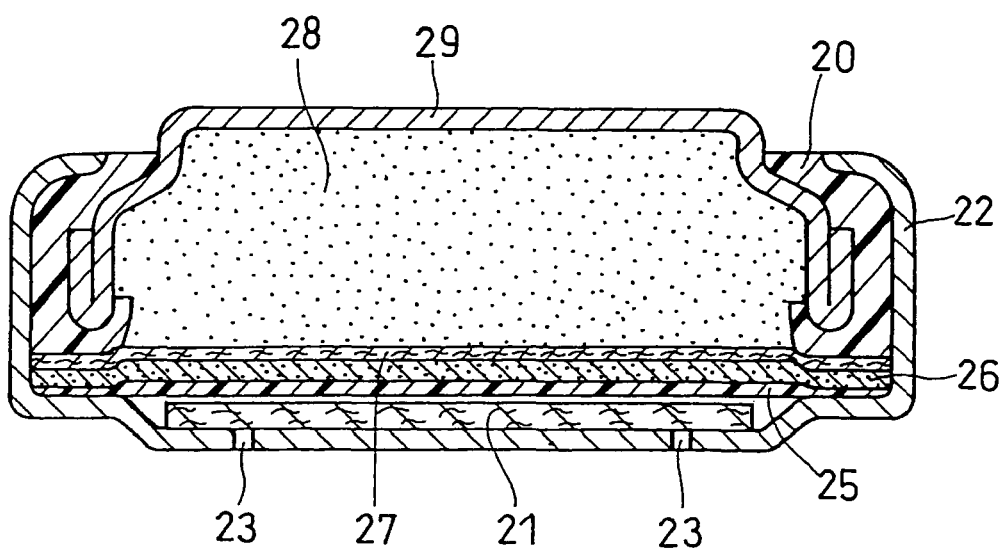
FIG. 2 illustrates a longitudinal section of a button air zinc battery, which is another example of alkaline batteries of the present invention.

Referring now to FIG. 2, an air zinc battery is described. FIG. 2 is a longitudinal sectional view of a button air zinc battery. A positive electrode case 22 of the button air zinc battery has air vents 23 in the depressed bottom. On the inner face of the depressed bottom of the positive electrode case 22 are an air diffusion paper 21, a water-repellent film 25, an air electrode 26 and a separator 27. On the separator 27 is a negative electrode 28. The negative electrode 28 is filled in a negative electrode case (conductive member) 29, and the inner wall of the negative electrode case 29 is in electrical contact with the negative electrode 28. The negative electrode case 29 has the function of sealing the opening of the positive electrode case 22. Seal tape (not shown) is affixed to the outer face of the depressed bottom of the positive electrode case 22 so as to close the air vents 23 when the battery is not in use. By removing the seal tape from the positive electrode case 22, oxygen enters the battery, thereby producing electromotive force.

The air zinc battery is prepared, for example, as follows.

First, the air diffusion paper 21, the water-repellent film 25, the air electrode 26 and the separator 27 are sequentially mounted on the inner face of the depressed bottom of the positive electrode case 22. The negative electrode 28 containing an alkaline electrolyte is filled into the negative electrode case 29. An insulating gasket 20 is fitted between the negative electrode case 29 and the positive electrode case 22, and the opening of the positive electrode case 22 is sealed by crimping. In this way, the air zinc battery can be obtained.

A porous material is used as the separator. The material of the separator is, for example, polypropylene, polyethylene or polytetrafluoroethylene. The separator is preferably a micro-porous film that has been subjected to a hydrophilic treatment. For example, a physical surface treatment by means of oxygen plasma may be applied to provide the surface of the micro-porous film with hydrophilic hydroxyl groups (—OH). Alternatively, a surfactant may be used to make the micro-porous film hydrophilic. Hydrogen gas produced in the negative electrode passes through the pores of the separator, the air electrode, and the air vent and is then discharged to the outside. Even when the air vents are closed with the seal tape, the hydrogen gas having passed through the separator is discharged to the outside through the adhesive layer of the tape.

The air electrode may be any conventionally known one. For example, a mixture containing manganese oxide, activated carbon, carbon black (ketjen black etc.) and polytetrafluoroethylene (PTFE) powder may be used.

The air diffusion paper may be any conventionally known one. Such an example is vinylon non-woven fabric. The air diffusion paper has the function of evenly diffusing air taken in through the air vents.

The water-repellent film may also be any conventionally known one. Such an example is a polytetrafluoroethylene (PTFE) micro-porous film. The water-repellent film has the function of supplying oxygen to the air electrode while preventing the electrolyte from leaking out of the battery.

In the air zinc battery of the present invention, the production of hydrogen gas is suppressed, and hydrogen gas produced is discharged from the battery. It is therefore possible to obtain an air zinc battery with excellent storage characteristics without adding mercury to the negative electrode.

By using the alkaline battery with the above-described characteristics, the production of hydrogen gas inside the battery can be sufficiently suppressed. Hence, when a non-used or partially discharged battery is stored, excellent storage characteristics can be obtained.

The present invention also pertains to a method for producing an alkaline battery. The production method of the present invention includes the step of preparing an alkaline electrolyte including a potassium hydroxide aqueous solution. This step includes the step of mixing the potassium hydroxide aqueous solution with a solute and diluting the resulting mixture with water to dissolve the solute. Upon dilution, due to heat generation and temperature increase, the solute completely dissolves to provide an alkaline electrolyte. Thus, an alkaline electrolyte with a constant metal-ion concentration can be readily prepared. The solute includes a zinc compound and a compound containing a metal element M. Preferably, the solute further includes a lithium compound.

The production method of the present invention also includes the step of preparing a negative electrode material mixture that includes: a gelling agent; and a negative electrode active material containing zinc and a metal element M other than zinc. The negative electrode material mixture can be obtained by mixing a gelling agent powder and a negative electrode active material powder containing the metal element M by dry blend.

The production method of the present invention also includes the step of mixing the alkaline electrolyte with the negative electrode material mixture to obtain a gelled negative electrode. By mixing the alkaline electrolyte and the negative electrode material mixture by wet blend, the negative electrode material mixture and the gelling agent are evenly mixed together, so that a gelled negative electrode can be obtained. The gelled negative electrode is then brought into contact with a conductive member containing the metal element M.

EXAMPLE 1

An AA size alkaline dry battery as illustrated in FIG. 1 was produced.

(Preparation of Alkaline Electrolyte)

An alkaline aqueous solution containing 40% by weight of potassium hydroxide, 3% by weight of zinc oxide, and 0.05% by weight of cuprous sulfate (copper content 0.028% by weight), serving as a compound containing a metal element M, was used as the alkaline electrolyte. The alkaline aqueous solution was prepared as follows.

First, a potassium hydroxide aqueous solution with a potassium hydroxide concentration of 60% by weight was mixed with zinc oxide powder and cuprous sulfate powder. The resulting mixture was diluted to provide a potassium hydroxide concentration of 40% by weight. Upon the dilution, the alkaline aqueous solution produced heat, so that the temperature increased. The respective powders were thus readily dissolved by stirring.

(Preparation of Negative Electrode)

Zinc alloy powder was prepared by atomization. Specifically, 0.003% by weight (30 ppm) of aluminum, 0.015% by weight (150 ppm) of bismuth, 0.05% by weight (500 ppm) of indium, and 0.005% by weight (50 ppm) of copper (metal element M) were dissolved in molten zinc. The resulting mixture was atomized to obtain a zinc alloy powder containing 0.005% by weight of copper (metal element M). The zinc alloy powder was then classified with a sieve to obtain a negative electrode active material powder with a mean particle size of 150 μm (45 to 150 mesh). The negative electrode active material powder and sodium polyacrylate powder serving as a gelling agent were mixed together to form a negative electrode material mixture. The negative electrode material mixture was then mixed with the alkaline electrolyte to form a gelled negative electrode. The amount of the negative electrode active material was set to 200 parts by weight per 100 parts by weight of the alkaline electrolyte. The amount of the sodium polyacrylate was set to 3 parts by weight per 100 parts by weight of the alkaline electrolyte.

(Plating of Negative Electrode Current Collector)

A nail-shaped brass conductive member was used as the negative electrode current collector. The surface of the current collector was electrolytically plated with copper serving as the metal element M. The thickness of the copper electrolytic plating was 2 μm.

(Preparation of Positive Electrode)

Electrolytic manganese dioxide for alkaline batteries, HH-PF, available from Tosoh Corporation was used as the positive electrode active material. A positive electrode material mixture was prepared by mixing 100 parts by weight of manganese dioxide, 11 parts by weight of graphite with a mean particle size of 150 μm, and 1 part by weight of the above-mentioned electrolyte with a mixer to obtain particles of 10 to 100 mesh. This positive electrode material mixture was molded into hollow cylinders under pressure, to obtain positive electrode material mixture pellets.

Non-woven fabric comprising polyvinyl alcohol fiber and rayon fiber was used as the separator.

(Production of Alkaline Dry Battery)

An iron member SPCD according to JIS (Japanese Industrial Standards), plated with nickel, was used as the positive electrode case 11. A plurality of the positive electrode material mixture pellets 13 were inserted into the positive electrode case 11 and repressed in the positive electrode case 11 so as to closely adhere to the inner face of the positive electrode case 11. The separator 14 and the insulating cap 15 were inserted into the hollow of the positive electrode material mixture pellets 13, and the alkaline electrolyte was injected therein. After the injection of the electrolyte, the gelled negative electrode 16 was filled into the hollow on the inner side of the separator 14.

Next, the negative electrode current collector 10 was inserted into the gelled negative electrode 16. The open edge of the positive electrode case 11 was crimped onto the circumference of the bottom plate 18 with the edge of the resin sealing member 17 interposed therebetween, so that the opening of the positive electrode case 11 was sealed. Lastly, the outer surface of the positive electrode case 11 was covered with the outer label 101. In this way, an alkaline dry battery according to Example 1 was produced.

EXAMPLE 2

An alkaline dry battery was produced in the same manner as in Example 1 except that the alkaline electrolyte contained cupric sulfate as the compound containing the metal element M and that the copper content was set to 0.020% by weight.

EXAMPLE 3

An alkaline dry battery was produced in the same manner as in Example 1 except that the alkaline electrolyte contained cuprous chloride as the compound containing the metal element M and that the copper content was set to 0.032% by weight.

EXAMPLE 4

An alkaline dry battery was produced in the same manner as in Example 1 except that the alkaline electrolyte contained cupric chloride as the compound containing the metal element M and that the copper content was set to 0.024% by weight.

EXAMPLE 5

An alkaline dry battery was produced in the same manner as in Example 1 except that the alkaline electrolyte further contained 0.5% by weight of lithium hydroxide.

EXAMPLE 6

An alkaline dry battery was produced in the same manner as in Example 1 except that the alkaline electrolyte contained cupric sulfate as the compound containing the metal element M and that the alkaline electrolyte further contained 0.5% by weight of lithium hydroxide.

EXAMPLE 7

An alkaline dry battery was produced in the same manner as in Example 1 except that the alkaline electrolyte contained cuprous chloride as the compound containing the metal element M and that the alkaline electrolyte further contained 0.5% by weight of lithium hydroxide.

EXAMPLE 8

An alkaline dry battery was produced in the same manner as in Example 1 except that the alkaline electrolyte contained cupric chloride as the compound containing the metal element M and that the alkaline electrolyte further contained 0.5% by weight of lithium hydroxide.

COMPARATIVE EXAMPLE 1

An alkaline dry battery was produced in the same manner as in Example 1 except that the negative electrode active material and the alkaline electrolyte did not contain copper as the metal element M.

COMPARATIVE EXAMPLE 2

An alkaline dry battery was produced in the same manner as in Comparative Example 1 except that the negative electrode active material contained 0.005% by weight of copper as the metal element M.

COMPARATIVE EXAMPLE 3

An alkaline dry battery was produced in the same manner as in Comparative Example 1 except that the alkaline electrolyte contained 0.05% by weight of cupric sulfate (copper content 0.020% by weight) as the compound containing the metal element M.

COMPARATIVE EXAMPLE 4

An alkaline dry battery was produced in the same manner as in Example 1 except that the surface of the current collector was plated with tin instead of copper.

EXAMPLE 9

The surface of the current collector was plated with tin as a metal element M. The negative electrode active material contained 0.005% by weight (50 ppm) of tin as the metal element M instead of copper. The alkaline electrolyte contained 0.05% by weight of stannous oxide (tin content 0.044% by weight) as a compound containing the metal element M. An alkaline dry battery was produced in the same manner as in Example 1 except for these differences.

EXAMPLE 10

An alkaline dry battery was produced in the same manner as in Example 9 except that the alkaline electrolyte contained stannic oxide as the compound containing the metal element M and that the tin content was set to 0.039% by weight.

EXAMPLE 11

An alkaline dry battery was produced in the same manner as in Example 9 except that the alkaline electrolyte contained potassium stannate as the compound containing the metal element M and that the tin content was set to 0.020% by weight.

EXAMPLE 12

An alkaline dry battery was produced in the same manner as in Example 9 except that the alkaline electrolyte contained sodium stannate as the compound containing the metal element M and that the tin content was set to 0.022% by weight.

EXAMPLE 13

An alkaline dry battery was produced in the same manner as in Example 9 except that the alkaline electrolyte further contained 0.5% by weight of lithium hydroxide.

EXAMPLE 14

An alkaline dry battery was produced in the same manner as in Example 9 except that the alkaline electrolyte contained stannic oxide as the compound containing the metal element M and that the alkaline electrolyte further contained 0.5% by weight of lithium hydroxide.

EXAMPLE 15

An alkaline dry battery was produced in the same manner as in Example 9 except that the alkaline electrolyte contained potassium stannate as the compound containing the metal element M and that the alkaline electrolyte further contained 0.5% by weight of lithium hydroxide.

EXAMPLE 16

An alkaline dry battery was produced in the same manner as in Example 9 except that the alkaline electrolyte contained sodium stannate as the compound containing the metal element M and that the alkaline electrolyte further contained 0.5% by weight of lithium hydroxide.

COMPARATIVE EXAMPLE 5

An alkaline dry battery was produced in the same manner as in Example 9 except that the negative electrode active material and the alkaline electrolyte did not contain tin as the metal element M.

COMPARATIVE EXAMPLE 6

An alkaline dry battery was produced in the same manner as in Comparative Example 5 except that the negative electrode active material contained 0.005% by weight of tin as the metal element M.

COMPARATIVE EXAMPLE 7

An alkaline dry battery was produced in the same manner as in Comparative Example 5 except that the alkaline electrolyte contained 0.05% by weight of stannic oxide (tin content 0.039% by weight) as the compound containing the metal element M.

COMPARATIVE EXAMPLE 8

An alkaline dry battery was produced in the same manner as in Example 9 except that the surface of the current collector was plated with copper instead of tin.

EXAMPLE 17

The surface of the current collector was plated with indium as a metal element M. Zinc alloy powder containing 0.003% by weight (30 ppm) of aluminum, 0.015% by weight (150 ppm) of bismuth, and 0.05% by weight (500 ppm) of indium was used as the negative electrode active material. The alkaline electrolyte contained 0.05% by weight of indium oxide (indium content 0.041% by weight) as a compound containing the metal element M. An alkaline dry battery was produced in the same manner as in Example 1 except for these differences.

EXAMPLE 18

An alkaline dry battery was produced in the same manner as in Example 17 except that the alkaline electrolyte contained indium hydroxide as the compound containing the metal element M and that the indium content was set to 0.035% by weight.

EXAMPLE 19

An alkaline dry battery was produced in the same manner as in Example 17 except that the alkaline electrolyte contained indium sulfate as the compound containing the metal element M and that the indium content was set to 0.022% by weight.

EXAMPLE 20

An alkaline dry battery was produced in the same manner as in Example 17 except that the alkaline electrolyte contained indium chloride as the compound containing the metal element M and that the indium content was set to 0.020% by weight.

EXAMPLE 21

An alkaline dry battery was produced in the same manner as in Example 17 except that the alkaline electrolyte further contained 0.5% by weight of lithium hydroxide.

EXAMPLE 22

An alkaline dry battery was produced in the same manner as in Example 17 except that the alkaline electrolyte contained indium hydroxide as the compound containing the metal element M and that the alkaline electrolyte further contained 0.5% by weight of lithium hydroxide.

EXAMPLE 23

An alkaline dry battery was produced in the same manner as in Example 17 except that the alkaline electrolyte contained indium sulfate as the compound containing the metal element M and that the alkaline electrolyte further contained 0.5% by weight of lithium hydroxide.

EXAMPLE 24

An alkaline dry battery was produced in the same manner as in Example 17 except that the alkaline electrolyte contained indium chloride as the compound containing the metal element M and that the alkaline electrolyte further contained 0.5% by weight of lithium hydroxide.

COMPARATIVE EXAMPLE 9

An alkaline dry battery was produced in the same manner as in Example 17 except that the alkaline electrolyte did not contain indium as the metal element M.

COMPARATIVE EXAMPLE 10

An alkaline dry battery was produced in the same manner as in Example 17 except that the surface of the current collector was plated with tin instead of indium.

Table 1 shows the compositions of the negative electrode active materials of the alkaline dry batteries thus produced and the compositions of the surfaces of the current collectors thereof. Table 2 shows the compositions of the alkaline electrolytes.

TABLE 1

| Battery No. | Zinc alloy (negative electrode active material) | Current collector surface |
|---|---|---|
| Example 1 | Al: 0.003 wt % Bi: 0.015 wt % In: 0.05 wt % Cu: 0.005 wt % | Cu |
| Example 2 | Al: 0.003 wt % Bi: 0.015 wt % In: 0.05 wt % Cu: 0.005 wt % | Cu |
| Example 3 | Al: 0.003 wt % Bi: 0.015 wt % In: 0.05 wt % Cu: 0.005 wt % | Cu |
| Example 4 | Al: 0.003 wt % Bi: 0.015 wt % In: 0.05 wt % Cu: 0.005 wt % | Cu |
| Example 5 | Al: 0.003 wt % Bi: 0.015 wt % In: 0.05 wt % Cu: 0.005 wt % | Cu |
| Example 6 | Al: 0.003 wt % Bi: 0.015 wt % In: 0.05 wt % Cu: 0.005 wt % | Cu |
| Example 7 | Al: 0.003 wt % Bi: 0.015 wt % In: 0.05 wt % Cu: 0.005 wt % | Cu |
| Example 8 | Al: 0.003 wt % Bi: 0.015 wt % In: 0.05 wt % Cu: 0.005 wt % | Cu |
| Comp. Example 1 | Al: 0.003 wt % Bi: 0.015 wt % In: 0.05 wt % | Cu |
| Comp. Example 2 | Al: 0.003 wt % Bi: 0.015 wt % In: 0.05 wt % Cu: 0.005 wt % | Cu |
| Comp. Example 3 | Al: 0.003 wt % Bi: 0.015 wt % In: 0.05 wt % | Cu |
| Comp. Example 4 | Al: 0.003 wt % Bi: 0.015 wt % In: 0.05 wt % Cu: 0.005 wt % | Sn |
| Example 9 | Al: 0.003 wt % Bi: 0.015 wt % In: 0.05 wt % Sn: 0.005 wt % | Sn |
| Example 10 | Al: 0.003 wt % Bi: 0.015 wt % In: 0.05 wt % Sn: 0.005 wt % | Sn |
| Example 11 | Al: 0.003 wt % Bi: 0.015 wt % In: 0.05 wt % Sn: 0.005 wt % | Sn |
| Example 12 | Al: 0.003 wt % Bi: 0.015 wt % In: 0.05 wt % Sn: 0.005 wt % | Sn |
| Example 13 | Al: 0.003 wt % Bi: 0.015 wt % In: 0.05 wt % Sn: 0.005 wt % | Sn |
| Example 14 | Al: 0.003 wt % Bi: 0.015 wt % In: 0.05 wt % Sn: 0.005 wt % | Sn |
| Example 15 | Al: 0.003 wt % Bi: 0.015 wt % In: 0.05 wt % Sn: 0.005 wt % | Sn |
| Example 16 | Al: 0.003 wt % Bi: 0.015 wt % In: 0.05 wt % Sn: 0.005 wt % | Sn |
| Comp. Example 5 | Al: 0.003 wt % Bi: 0.015 wt % In: 0.05 wt % | Sn |
| Comp. Example 6 | Al: 0.003 wt % Bi: 0.015 wt % In: 0.05 wt % Sn: 0.005 wt % | Sn |
| Comp. Example 7 | Al: 0.003 wt % Bi: 0.015 wt % In: 0.05 wt % | Sn |
| Comp. Example 8 | Al: 0.003 wt % Bi: 0.015 wt % In: 0.05 wt % Sn: 0.005 wt % | Cu |
| Example 17 | Al: 0.003 wt % Bi: 0.015 wt % In: 0.05 wt % | In |
| Example 18 | Al: 0.003 wt % Bi: 0.015 wt % In: 0.05 wt % | In |
| Example 19 | Al: 0.003 wt % Bi: 0.015 wt % In: 0.05 wt % | In |
| Example 20 | Al: 0.003 wt % Bi: 0.015 wt % In: 0.05 wt % | In |
| Example 21 | Al: 0.003 wt % Bi: 0.015 wt % In: 0.05 wt % | In |
| Example 22 | Al: 0.003 wt % Bi: 0.015 wt % In: 0.05 wt % | In |
| Example 23 | Al: 0.003 wt % Bi: 0.015 wt % In: 0.05 wt % | In |
| Example 24 | Al: 0.003 wt % Bi: 0.015 wt % In: 0.05 wt % | In |
| Comp. Example 9 | Al: 0.003 wt % Bi: 0.015 wt % In: 0.05 wt % | In |
| Comp. Example 10 | Al: 0.003 wt % Bi: 0.015 wt % In: 0.05 wt % | Sn |

TABLE 2

| Battery No. | Alkaline electrolyte |
|---|---|
| Example 1 | KOH: 40 wt % ZnO: 3 wt % $Cu_2SO_4$: 0.05 wt % |
| Example 2 | KOH: 40 wt % ZnO: 3 wt % $CuSO_4$: 0.05 wt % |
| Example 3 | KOH: 40 wt % ZnO: 3 wt % CuCl: 0.05 wt % |
| Example 4 | KOH: 40 wt % ZnO: 3 wt % $CuCl_2$: 0.05 wt % |
| Example 5 | KOH: 40 wt % ZnO: 3 wt % $Cu_2SO_4$: 0.05 wt % LiOH: 0.5 wt % |
| Example 6 | KOH: 40 wt % ZnO: 3 wt % $CuSO_4$: 0.05 wt % LiOH: 0.5 wt % |
| Example 7 | KOH: 40 wt % ZnO: 3 wt % CuCl: 0.05 wt % LiOH: 0.5 wt % |
| Example 8 | KOH: 40 wt % ZnO: 3 wt % $CuCl_2$: 0.05 wt % LiOH: 0.5 wt % |
| Comp. Example 1 | KOH: 40 wt % ZnO: 3 wt % |
| Comp. Example 2 | KOH: 40 wt % ZnO: 3 wt % |
| Comp. Example 3 | KOH: 40 wt % ZnO: 3 wt % $CuSO_4$: 0.05 wt % |
| Comp. Example 4 | KOH: 40 wt % ZnO: 3 wt % $Cu_2SO_4$: 0.05 wt % |
| Example 9 | KOH: 40 wt % ZnO: 3 wt % SnO: 0.05 wt % |
| Example 10 | KOH: 40 wt % ZnO: 3 wt % $SnO_2$: 0.05 wt % |
| Example 11 | KOH: 40 wt % ZnO: 3 wt % $K_2SnO_3 \cdot 3H_2O$: 0.05 wt % |
| Example 12 | KOH: 40 wt % ZnO: 3 wt % $Na_2SnO_3 \cdot 3H_2O$: 0.05 wt % |
| Example 13 | KOH: 40 wt % ZnO: 3 wt % SnO: 0.05 wt % LiOH: 0.5 wt % |
| Example 14 | KOH: 40 wt % ZnO: 3 wt % $SnO_2$: 0.05 wt % LiOH: 0.5 wt % |
| Example 15 | KOH: 40 wt % ZnO: 3 wt % $K_2SnO_3 \cdot 3H_2O$: 0.05 wt % LiOH: 0.5 wt % |
| Example 16 | KOH: 40 wt % ZnO: 3 wt % $Na_2SnO_3 \cdot 3H_2O$: 0.05 wt % LiOH: 0.5 wt % |
| Comp. Example 5 | KOH: 40 wt % ZnO: 3 wt % |
| Comp. Example 6 | KOH: 40 wt % ZnO: 3 wt % |
| Comp. Example 7 | KOH: 40 wt % ZnO: 3 wt % $SnO_2$: 0.05 wt % |
| Comp. Example 8 | KOH: 40 wt % ZnO: 3 wt % SnO: 0.05 wt % |
| Example 17 | KOH: 40 wt % ZnO: 3 wt % $In_2O_3$: 0.05 wt % |
| Example 18 | KOH: 40 wt % ZnO: 3 wt % $In(OH)_3$: 0.05 wt % |
| Example 19 | KOH: 40 wt % ZnO: 3 wt % $In_2(SO_4)_3$: 0.05 wt % |
| Example 20 | KOH: 40 wt % ZnO: 3 wt % $InCl_3 \cdot 4H_2O$: 0.05 wt % |
| Example 21 | KOH: 40 wt % ZnO: 3 wt % $In_2O_3$: 0.05 wt % LiOH: 0.5 wt % |

TABLE 2-continued

| Battery No. | Alkaline electrolyte |
|---|---|
| Example 22 | KOH: 40 wt % ZnO: 3 wt % In(OH)$_3$: 0.05 wt % LiOH: 0.5 wt % |
| Example 23 | KOH: 40 wt % ZnO: 3 wt % In$_2$(SO$_4$)$_3$: 0.05 wt % LiOH: 0.5 wt % |
| Example 24 | KOH: 40 wt % ZnO: 3 wt % InCl$_3$•4H$_2$O: 0.05 wt % LiOH: 0.5 wt % |
| Comp. Example 9 | KOH: 40 wt % ZnO: 3 wt % |
| Comp. Example 10 | KOH: 40 wt % ZnO: 3 wt % In$_2$O$_3$: 0.05 wt % |

(Evaluation Test)

The storage characteristics of the alkaline dry batteries produced in Examples 1 to 24 and Comparative Examples 1 to 10 were evaluated as follows. The batteries were stored in a constant temperature environment at 60° C. for 1 week. After the storage, the batteries were subjected to a pulse discharge in a 20° C. environment in the following pattern: discharge at a constant current of 1000 mA for 10 seconds, followed by an interval of 50 seconds. The discharge time it took for the voltage to drop to a cut-off voltage of 0.9 V was measured. The average value of three batteries was used as the pulse discharge time. Table 3 shows the measurement results.

Also, the amount of hydrogen gas produced was evaluated as follows.

The batteries after the storage were disassembled in liquid paraffin to collect gas and the amount of gas that accumulated in the battery was determined. In order to obtain the value of the amount of hydrogen gas, the values of three batteries of each Example and Comparative Example were averaged. The amount of hydrogen gas produced in Comparative Example 1 was defined as 100, and the amount of hydrogen gas produced in each of Examples 1 to 24 and Comparative Examples 2 to 10 was expressed as a value relative to Comparative Example 1. Table 3 shows the measurement results.

TABLE 3

| | After 1 week storage at 60° C. | |
|---|---|---|
| Battery No. | 1000 mA pulse discharge time (min) | Amount of hydrogen gas produced |
| Example 1 | 42 | 77 |
| Example 2 | 44 | 76 |
| Example 3 | 41 | 74 |
| Example 4 | 45 | 72 |
| Example 5 | 50 | 63 |
| Example 6 | 49 | 69 |
| Example 7 | 48 | 71 |
| Example 8 | 49 | 70 |
| Comp. Example 1 | 21 | 100 |
| Comp. Example 2 | 24 | 96 |
| Comp. Example 3 | 28 | 91 |
| Comp. Example 4 | 32 | 88 |
| Example 9 | 48 | 70 |
| Example 10 | 55 | 58 |
| Example 11 | 49 | 68 |
| Example 12 | 49 | 67 |
| Example 13 | 52 | 61 |
| Example 14 | 55 | 58 |
| Example 15 | 54 | 57 |
| Example 16 | 53 | 60 |
| Comp. Example 5 | 26 | 93 |
| Comp. Example 6 | 29 | 89 |
| Comp. Example 7 | 30 | 87 |
| Comp. Example 8 | 28 | 91 |
| Example 17 | 47 | 70 |
| Example 18 | 48 | 69 |
| Example 19 | 48 | 67 |
| Example 20 | 49 | 66 |
| Example 21 | 50 | 64 |

TABLE 3-continued

| | After 1 week storage at 60° C. | |
|---|---|---|
| Battery No. | 1000 mA pulse discharge time (min) | Amount of hydrogen gas produced |
| Example 22 | 51 | 63 |
| Example 23 | 52 | 62 |
| Example 24 | 51 | 60 |
| Comp. Example 9 | 29 | 90 |
| Comp. Example 10 | 27 | 92 |

In the batteries of Comparative Examples 1 to 3, the surface of the current collector is plated with copper. In Comparative Example 3, the alkaline electrolyte contains copper as the metal element M. In Comparative Example 2, the negative electrode active material contains copper. In Comparative Example 1, the negative electrode active material and the alkaline electrolyte do not contain copper. In this order of Comparative Examples 3, 2, and 1, the pulse discharge time after the 1-week storage at 60° C. decreased and the amount of hydrogen gas increased. In the battery of Comparative Example 4, only the surface of the current collector does not include copper. Although Comparative Example 4 exhibited a longer pulse discharge time and less hydrogen gas production than Comparative Examples 1 to 3, it is not sufficient.

In the batteries of Comparative Examples 5 to 7, the surface of the current collector is plated with tin. In Comparative Example 7, the alkaline electrolyte contains tin as the metal element M. In Comparative Example 6, the negative electrode active material contains tin. In Comparative Example 5, the negative electrode active material and the alkaline electrolyte do not contain tin. In this order of Comparative Examples 7, 6, and 5, the pulse discharge time after the 1-week storage at 60° C. decreased and the amount of hydrogen gas increased. In the battery of Comparative Example 8, only the surface of the current collector does not include tin. This battery also did not exhibit a sufficient pulse discharge time or decreased hydrogen gas production.

In the battery of Comparative Example 9, the surface of the current collector is plated with indium and the negative electrode active material contains indium as the metal element M. This battery also exhibited a decreased pulse discharge time after the 1-week storage at 60° C. and increased hydrogen gas production in the same manner as in Comparative Example 2 in which the current collector surface and the negative electrode active material include copper. In the battery of Comparative Example 10, only the surface of the current collector does not include indium. This battery also did not exhibit a sufficient pulse discharge time or decreased hydrogen gas production.

In the batteries of Examples 1 to 4, 9 to 12, and 17 to 20, all of the negative electrode active material, the alkaline electrolyte, and the surface of the current collector include the metal element M. In Table 3, Examples 1 to 4, 9 to 12, and 17 to 20 exhibited longer pulse discharge times and less hydrogen gas production after the 1-week storage than Comparative Examples 1 to 10.

In the batteries of Examples 5 to 8, 13 to 16, and 21 to 24, all of the negative electrode active material, the alkaline electrolyte, and the surface of the current collector include the metal element M and the alkaline electrolyte further contains 0.5% by weight of lithium hydroxide.

Examples 5 to 8, 13 to 16, and 21 to 24 exhibited longer pulse discharge times and less hydrogen gas production than Examples 1 to 4, 9 to 12, and 17 to 20. This indicates that the lithium hydroxide contained in the alkaline electrolyte provides more favorable storage characteristics.

As described above, when the negative electrode active material, the alkaline electrolyte, and the negative electrode current collector include the same metal element M, the amount of hydrogen gas produced during the 60° C. storage was suppressed and the pulse discharge time after the 1-week storage was improved. Also, when the alkaline electrolyte further contains lithium hydroxide, the batteries with the above-described configuration provided good storage characteristics. Particularly when the alkaline electrolyte contains tetravalent tin, such batteries provided the most favorable storage characteristics both in Examples 10 to 12 including no lithium hydroxide and in Examples 14 to 16 including lithium hydroxide.

EXAMPLE 25

An alkaline dry battery was produced in the same manner as in Example 5 except that the lithium hydroxide content in the alkaline electrolyte was set to 0.005% by weight.

EXAMPLE 26

An alkaline dry battery was produced in the same manner as in Example 5 except that the lithium hydroxide content in the alkaline electrolyte was set to 0.01% by weight.

EXAMPLE 27

An alkaline dry battery was produced in the same manner as in Example 5 except that the lithium hydroxide content in the alkaline electrolyte was set to 0.05% by weight.

EXAMPLE 28

An alkaline dry battery was produced in the same manner as in Example 5 except that the lithium hydroxide content in the alkaline electrolyte was set to 0.1% by weight.

EXAMPLE 29

An alkaline dry battery was produced in the same manner as in Example 5 except that the lithium hydroxide content in the alkaline electrolyte was set to 1.5% by weight.

EXAMPLE 30

An alkaline dry battery was produced in the same manner as in Example 5 except that the lithium hydroxide content in the alkaline electrolyte was set to 2% by weight.

EXAMPLE 31

An alkaline dry battery was produced in the same manner as in Example 5 except that the lithium hydroxide content in the alkaline electrolyte was set to 3% by weight.

EXAMPLE 32

An alkaline dry battery was produced in the same manner as in Example 10 except that the stannic oxide content in the alkaline electrolyte was set to 0.001% by weight (tin content 0.00079% by weight).

EXAMPLE 33

An alkaline dry battery was produced in the same manner as in Example 10 except that the stannic oxide content in the alkaline electrolyte was set to 0.002% by weight (tin content 0.0016% by weight).

EXAMPLE 34

An alkaline dry battery was produced in the same manner as in Example 10 except that the stannic oxide content in the alkaline electrolyte was set to 0.005% by weight (tin content 0.0039% by weight).

EXAMPLE 35

An alkaline dry battery was produced in the same manner as in Example 10 except that the stannic oxide content in the alkaline electrolyte was set to 0.08% by weight (tin content 0.063% by weight).

EXAMPLE 36

An alkaline dry battery was produced in the same manner as in Example 10 except that the stannic oxide content in the alkaline electrolyte was set to 0.1% by weight (tin content 0.079% by weight).

EXAMPLE 37

An alkaline dry battery was produced in the same manner as in Example 10 except that the stannic oxide content in the alkaline electrolyte was set to 0.15% by weight (tin content 0.118% by weight).

EXAMPLE 38

An alkaline dry battery was produced in the same manner as in Example 10 except that the tin (metal element M) content in the negative electrode active material was set to 0.001% by weight (10 ppm).

EXAMPLE 39

An alkaline dry battery was produced in the same manner as in Example 10 except that the tin (metal element M) content in the negative electrode active material was set to 0.0015% by weight (15 ppm).

EXAMPLE 40

An alkaline dry battery was produced in the same manner as in Example 10 except that the tin (metal element M) content in the negative electrode active material was set to 0.003% by weight (30 ppm).

EXAMPLE 41

An alkaline dry battery was produced in the same manner as in Example 10 except that the tin (metal element M) content in the negative electrode active material was set to 0.05% by weight (500 ppm).

EXAMPLE 42

An alkaline dry battery was produced in the same manner as in Example 10 except that the tin (metal element M) content in the negative electrode active material was set to 0.06% by weight (600 ppm).

EXAMPLE 43

An alkaline dry battery was produced in the same manner as in Example 10 except that the tin (metal element M) content in the negative electrode active material was set to 0.07% by weight (700 ppm).

Table 4 shows the compositions of the negative electrode active materials of the alkaline dry batteries thus produced and the compositions of the surfaces of the current collectors thereof. Table 5 shows the compositions of the alkaline electrolytes.

TABLE 4

| Battery No. | Zinc alloy (negative electrode active material) | Current collector surface |
|---|---|---|
| Example 25 | Al: 0.003 wt % Bi: 0.015 wt % In: 0.05 wt % Cu: 0.005 wt % | Cu |
| Example 26 | Al: 0.003 wt % Bi: 0.015 wt % In: 0.05 wt % Cu: 0.005 wt % | Cu |
| Example 27 | Al: 0.003 wt % Bi: 0.015 wt % In: 0.05 wt % Cu: 0.005 wt % | Cu |
| Example 28 | Al: 0.003 wt % Bi: 0.015 wt % In: 0.05 wt % Cu: 0.005 wt % | Cu |
| Example 29 | Al: 0.003 wt % Bi: 0.015 wt % In: 0.05 wt % Cu: 0.005 wt % | Cu |
| Example 30 | Al: 0.003 wt % Bi: 0.015 wt % In: 0.05 wt % Cu: 0.005 wt % | Cu |
| Example 31 | Al: 0.003 wt % Bi: 0.015 wt % In: 0.05 wt % Cu: 0.005 wt % | Cu |
| Example 32 | Al: 0.003 wt % Bi: 0.015 wt % In: 0.05 wt % Sn: 0.005 wt % | Sn |
| Example 33 | Al: 0.003 wt % Bi: 0.015 wt % In: 0.05 wt % Sn: 0.005 wt % | Sn |
| Example 34 | Al: 0.003 wt % Bi: 0.015 wt % In: 0.05 wt % Sn: 0.005 wt % | Sn |
| Example 35 | Al: 0.003 wt % Bi: 0.015 wt % In: 0.05 wt % Sn: 0.005 wt % | Sn |
| Example 36 | Al: 0.003 wt % Bi: 0.015 wt % In: 0.05 wt % Sn: 0.005 wt % | Sn |
| Example 37 | Al: 0.003 wt % Bi: 0.015 wt % In: 0.05 wt % Sn: 0.005 wt % | Sn |
| Example 38 | Al: 0.003 wt % Bi: 0.015 wt % In: 0.05 wt % Sn: 0.001 wt % | Sn |
| Example 39 | Al: 0.003 wt % Bi: 0.015 wt % In: 0.05 wt % Sn: 0.0015 wt % | Sn |
| Example 40 | Al: 0.003 wt % Bi: 0.015 wt % In: 0.05 wt % Sn: 0.003 wt % | Sn |
| Example 41 | Al: 0.003 wt % Bi: 0.015 wt % In: 0.05 wt % Sn: 0.05 wt % | Sn |
| Example 42 | Al: 0.003 wt % Bi: 0.015 wt % In: 0.05 wt % Sn: 0.06 wt % | Sn |
| Example 43 | Al: 0.003 wt % Bi: 0.015 wt % In: 0.05 wt % Sn: 0.07 wt % | Sn |

TABLE 5

| Battery No. | Alkaline electrolyte |
|---|---|
| Example 25 | KOH: 40 wt % ZnO: 3 wt % $Cu_2SO_4$: 0.05 wt % LiOH: 0.005 wt % |
| Example 26 | KOH: 40 wt % ZnO: 3 wt % $Cu_2SO_4$: 0.05 wt % LiOH: 0.01 wt % |
| Example 27 | KOH: 40 wt % ZnO: 3 wt % $Cu_2SO_4$: 0.05 wt % LiOH: 0.05 wt % |
| Example 28 | KOH: 40 wt % ZnO: 3 wt % $Cu_2SO_4$: 0.05 wt % LiOH: 0.1 wt % |
| Example 29 | KOH: 40 wt % ZnO: 3 wt % $Cu_2SO_4$: 0.05 wt % LiOH: 1.5 wt % |
| Example 30 | KOH: 40 wt % ZnO: 3 wt % $Cu_2SO_4$: 0.05 wt % LiOH: 2 wt % |
| Example 31 | KOH: 40 wt % ZnO: 3 wt % $Cu_2SO_4$: 0.05 wt % LiOH: 3 wt % |
| Example 32 | KOH: 40 wt % ZnO: 3 wt % $SnO_2$: 0.001 wt % |
| Example 33 | KOH: 40 wt % ZnO: 3 wt % $SnO_2$: 0.002 wt % |
| Example 34 | KOH: 40 wt % ZnO: 3 wt % $SnO_2$: 0.005 wt % |
| Example 35 | KOH: 40 wt % ZnO: 3 wt % $SnO_2$: 0.08 wt % |
| Example 36 | KOH: 40 wt % ZnO: 3 wt % $SnO_2$: 0.1 wt % |
| Example 37 | KOH: 40 wt % ZnO: 3 wt % $SnO_2$: 0.15 wt % |
| Example 38 | KOH: 40 wt % ZnO: 3 wt % $SnO_2$: 0.05 wt % |
| Example 39 | KOH: 40 wt % ZnO: 3 wt % $SnO_2$: 0.05 wt % |
| Example 40 | KOH: 40 wt % ZnO: 3 wt % $SnO_2$: 0.05 wt % |
| Example 41 | KOH: 40 wt % ZnO: 3 wt % $SnO_2$: 0.05 wt % |
| Example 42 | KOH: 40 wt % ZnO: 3 wt % $SnO_2$: 0.05 wt % |
| Example 43 | KOH: 40 wt % ZnO: 3 wt % $SnO_2$: 0.05 wt % |

The storage characteristics of the alkaline dry batteries produced in Examples 25 to 43 were evaluated by measuring the pulse discharge characteristics and the amount of hydrogen gas production in the same manner as the above. Table 6 shows the measurement results.

TABLE 6

| | After 1 week storage at 60° C. | |
|---|---|---|
| Battery No. | 1000 mA pulse discharge time (min) | Amount of hydrogen gas produced |
| Example 25 | 41 | 77 |
| Example 26 | 47 | 70 |
| Example 27 | 49 | 67 |
| Example 28 | 51 | 62 |
| Example 29 | 50 | 64 |
| Example 30 | 45 | 73 |
| Example 31 | 42 | 78 |
| Example 32 | 34 | 84 |
| Example 33 | 49 | 65 |
| Example 34 | 54 | 58 |
| Example 35 | 55 | 59 |
| Example 36 | 51 | 64 |
| Example 37 | 33 | 83 |
| Example 38 | 36 | 83 |
| Example 39 | 49 | 86 |
| Example 40 | 54 | 57 |
| Example 41 | 55 | 58 |
| Example 42 | 48 | 67 |
| Example 43 | 38 | 80 |

In the batteries of Examples 25 to 31, all of the negative electrode active material, the alkaline electrolyte, and the current collector include copper as the metal element M, the alkaline electrolyte further contains lithium hydroxide, and the lithium hydroxide content is varied. Example 25 with a lithium hydroxide content of 0.005% by weight and Example 31 with a content of 3% by weight exhibited almost the same pulse discharge time and almost the same amount of hydrogen gas as Example 1 including no lithium hydroxide. Thus, there is no influence of the lithium hydroxide contained therein. Example 26 with a lithium hydroxide content of 0.01% by weight and Example 30 with a content of 2% by weight exhibited longer pulse discharge times and less hydrogen gas production than Example 1 including no lithium hydroxide. This indicates that when the lithium hydroxide content is 0.01 to 2% by weight, good storage characteristics can be obtained. Further, Examples 27 to 29 exhibited significant increases in pulse discharge time and significant reductions in hydrogen gas production. This suggests that the optimum lithium hydroxide content is 0.05 to 1.5% by weight.

In the batteries of Examples 32 to 37, all of the negative electrode active material, the alkaline electrolyte, and the surface of the current collector include tin as the metal element M and the stannic oxide content (tin content) in the alkaline electrolyte is varied. Example 32 with a stannic oxide content of 0.001% by weight (tin content of 0.00079% by weight) and Example 37 with a stannic oxide content of 0.15% by weight (tin content of 0.118% by weight) exhibited slight increases in pulse discharge time and slight decreases in hydrogen gas production relative to Comparative Example 6 with a tin-free electrolyte. On the other hand, Example 33 with a stannic oxide content of 0.002% by weight (tin content of 0.0016% by weight) and Example 36 with a stannic oxide content of 0.1% by weight (tin content of 0.079% by weight) exhibited large increases in pulse discharge time and large decreases in hydrogen gas production relative to Comparative Example 6. This indicates that when the stannic oxide content is 0.002 to 0.1% by weight (the tin content is 0.0016 to 0.079% by weight), good storage characteristics can be obtained. Further, Examples 34 to 35 exhibited significant increases in discharge time and significant decreases in hydrogen gas production. This suggests that the optimum stannic oxide content is 0.005 to 0.08% by weight (the optimum tin content is 0.0039 to 0.063% by weight).

Also, in the batteries where the alkaline electrolyte contains a compound containing tin other than stannic oxide, for example, stannous oxide, potassium stannate, or sodium stannate, the content thereof was varied. These batteries also produced essentially the same effects in terms of both increase in pulse discharge time and decrease in hydrogen gas production.

Further, in the batteries where all of the negative electrode active material, the alkaline electrolyte, and the surface of the current collector include copper as the metal element M, the content of the copper-containing compound (copper content) in the alkaline electrolyte was also varied. These batteries also produced essentially the same effects as the above-mentioned batteries including tin.

Furthermore, in the batteries where all of the negative electrode active material, the alkaline electrolyte, and the surface of the current collector include indium as the metal element M, the content of the indium-containing compound (indium content) in the alkaline electrolyte was also varied. These batteries also produced essentially the same effects as the above-mentioned batteries including tin.

In the batteries of Examples 38 to 43, all of the negative electrode active material, the alkaline electrolyte, and the surface of the current collector include tin as the metal element M and the tin content in the negative electrode active material is varied. Example 38 where the negative electrode active material has a tin content of 0.001% by weight (10 ppm) and Example 43 with a content of 0.07% by weight (700 ppm) exhibited slight increases in pulse discharge time and slight decreases in hydrogen gas production relative to Comparative Example 7 where the negative electrode active material contains no tin. On the other hand, Example 39 where the negative electrode active material has a tin content of 0.0015% by weight (15 ppm) and Example 42 with a content of 0.06% by weight (600 ppm) exhibited large increases in pulse discharge time and large decreases in hydrogen gas production relative to Comparative Example 7 where the negative electrode active material contain no tin. This indicates that when the tin content in the negative electrode active material is 0.0015 to 0.06% by weight (15 to 600 ppm), good storage characteristics can be obtained. Further, Examples 40 to 41 exhibited significant increases in discharge time and significant decreases in hydrogen gas production. This indicates that the optimum tin content in the negative electrode active material is 0.003 to 0.05% by weight (30 to 500 ppm).

Further, in the batteries where all of the negative electrode active material, the alkaline electrolyte, and the surface of the current collector include copper as the metal element M, the copper content in the negative electrode active material was varied. These batteries also produced essentially the same effects as the above-mentioned batteries including tin.

Further, in the batteries where all of the negative electrode active material, the alkaline electrolyte, and the surface of the current collector include indium as the metal element M, the indium content in the negative electrode active material was varied. These batteries also produced essentially the same effects as the above-mentioned batteries including tin.

EXAMPLE 44

A button air zinc battery of R44 size according to JIS standard (diameter 11.6 mm, height 5.4 mm), as illustrated in FIG. 2, was produced.

(Preparation of Alkaline Electrolyte)

An alkaline aqueous solution containing 40% by weight of potassium hydroxide, 3% by weight of zinc oxide, and 0.05% by weight of cuprous sulfate (copper content 0.028% by weight), serving as a compound containing a metal element M, was used as the alkaline electrolyte. The alkaline aqueous solution was prepared in the same manner as in Example 1.

(Preparation of Negative Electrode)

In the same manner as in Example 1, zinc alloy powder containing 0.005% by weight (50 ppm) of copper as the metal element M was prepared. This zinc alloy powder was mixed with the gelling agent and the alkaline electrolyte to form a gelled negative electrode in the same manner as in Example 1.

(Preparation of Negative Electrode Case)

A three-layer clad material (nickel-stainless steel-copper) serving as a conductive member was used as a negative electrode case. The clad material was shaped into a case such that the surface thereof to come into contact with the negative electrode was copper.

(Preparation of Air Electrode)

A sheet for use as an air electrode was prepared in the following manner. First, 40% by weight of manganese oxide, 30% by weight of activated carbon, 20% by weight of ketjen black, and 10% by weight of PTFE powder were fully mixed together. This mixture was grinded into powder with a mixer and applied onto a nickel-plated stainless steel net of 30 mesh (wire diameter 0.016 mm) to obtain an air electrode sheet. A PTFE membrane with a porosity of 40% was bonded under pressure to one side of the sheet, which was then punched out into predetermined dimensions. The thickness of the air electrode was set to 0.3 mm, and the Gurley number of the laminate of the air electrode and the PTFE membrane was set to 10000 seconds.

A two-layer film, composed of a laminate of a polypropylene micro-porous film subjected to a hydrophilic treatment and a polypropylene non-woven fabric, was used as a separator. The hydrophilic treatment was performed by using oxygen plasma. A 0.13-mm-thick vinylon non-woven fabric was used as an air diffusion paper. Also, a 0.1-mm-thick polytetrafluoroethylene (PTFE) micro-porous film with a porosity of 20% was used as a water-repellent film.

(Production of Air Zinc Battery)

An iron member SPCD, plated with nickel, was used as the positive electrode case 22. The positive electrode case 22 has four 0.5-mm-diameter holes in the depressed bottom as the air vents 23 and has an open top. Pitch was applied to the side wall of the positive electrode case 22 to prevent electrolyte leakage. The air diffusion paper 21, the laminate of the water-repellent film 25 and the air electrode 26, and the separator 27 were sequentially mounted on the inner face of the depressed bottom of the positive electrode case 22. The negative electrode 28 containing the alkaline electrolyte was filled into the negative electrode case 29. Subsequently, the insulating gasket 20 made of nylon was fitted between the negative electrode case 29 and the positive electrode case 22, and the opening of the positive electrode case 22 was sealed by crimping. In this way, an air zinc battery according to Example 44 was produced.

EXAMPLE 45

An air zinc battery was produced in the same manner as in Example 44 except that the alkaline electrolyte contained cupric sulfate as the compound containing the metal element M and that the copper content was set to 0.020% by weight.

EXAMPLE 46

An air zinc battery was produced in the same manner as in Example 44 except that the alkaline electrolyte contained cuprous chloride as the compound containing the metal element M and that the copper content was set to 0.032% by weight.

EXAMPLE 47

An air zinc battery was produced in the same manner as in Example 44 except that the alkaline electrolyte contained cupric chloride as the compound containing the metal element M and that the copper content was set to 0.024% by weight.

EXAMPLE 48

An air zinc battery was produced in the same manner as in Example 44 except that the alkaline electrolyte further contained 0.5% by weight of lithium hydroxide.

EXAMPLE 49

An air zinc battery was produced in the same manner as in Example 44 except that the alkaline electrolyte contained cupric sulfate as the compound containing the metal element M and that the alkaline electrolyte further contained 0.5% by weight of lithium hydroxide.

EXAMPLE 50

An air zinc battery was produced in the same manner as in Example 44 except that the alkaline electrolyte contained cuprous chloride as the compound containing the metal element M and that the alkaline electrolyte further contained 0.5% by weight of lithium hydroxide.

EXAMPLE 51

An air zinc battery was produced in the same manner as in Example 44 except that the alkaline electrolyte contained cupric chloride as the compound containing the metal element M and that the alkaline electrolyte further contained 0.5% by weight of lithium hydroxide.

COMPARATIVE EXAMPLE 11

An air zinc battery was produced in the same manner as in Example 44 except that the negative electrode active material and the alkaline electrolyte did not contain copper as the metal element M.

COMPARATIVE EXAMPLE 12

An air zinc battery was produced in the same manner as in Comparative Example 11 except that the negative electrode active material contained 0.005% by weight of copper as the metal element M.

COMPARATIVE EXAMPLE 13

An air zinc battery was produced in the same manner as in Comparative Example 11 except that the alkaline electrolyte contained 0.05% by weight of cupric sulfate (copper content 0.020% by weight) as the compound containing the metal element M.

COMPARATIVE EXAMPLE 14

An air zinc battery was produced in the same manner as in Example 44 except that the inner face of the negative electrode case (the surface in contact with the negative electrode) was plated with tin.

EXAMPLE 52

The inner face of the negative electrode case (the surface in contact with the negative electrode) was plated with tin as the metal element M. The negative electrode active material contained 0.005% by weight (50 ppm) of tin as the metal element M instead of copper. The alkaline electrolyte contained 0.05% by weight of stannous oxide (tin content 0.044% by weight) as the compound containing the metal element M. An air zinc battery was produced in the same manner as in Example 44 except for these differences.

EXAMPLE 53

An air zinc battery was produced in the same manner as in Example 52 except that the alkaline electrolyte contained stannic oxide as the compound containing the metal element M and that the tin content was set to 0.039% by weight.

EXAMPLE 54

An air zinc battery was produced in the same manner as in Example 52 except that the alkaline electrolyte contained potassium stannate as the compound containing the metal element M and that the tin content was set to 0.020% by weight.

EXAMPLE 55

An air zinc battery was produced in the same manner as in Example 52 except that the alkaline electrolyte contained sodium stannate as the compound containing the metal element M and that the tin content was set to 0.022% by weight.

EXAMPLE 56

An air zinc battery was produced in the same manner as in Example 52 except that the alkaline electrolyte further contained 0.5% by weight of lithium hydroxide.

EXAMPLE 57

An air zinc battery was produced in the same manner as in Example 52 except that the alkaline electrolyte contained stannic oxide as the compound containing the metal element M and that the alkaline electrolyte further contained 0.5% by weight of lithium hydroxide.

EXAMPLE 58

An air zinc battery was produced in the same manner as in Example 52 except that the alkaline electrolyte contained potassium stannate as the compound containing the metal element M and that the alkaline electrolyte further contained 0.5% by weight of lithium hydroxide.

EXAMPLE 59

An air zinc battery was produced in the same manner as in Example 52 except that the alkaline electrolyte contained sodium stannate as the compound containing the metal element M and that the alkaline electrolyte further contained 0.5% by weight of lithium hydroxide.

COMPARATIVE EXAMPLE 15

An air zinc battery was produced in the same manner as in Example 52 except that the negative electrode active material and the alkaline electrolyte contained no tin as the metal element M.

COMPARATIVE EXAMPLE 16

An air zinc battery was produced in the same manner as in Comparative Example 15 except that the negative electrode active material contained 0.005% by weight of tin as the metal element M.

COMPARATIVE EXAMPLE 17

An air zinc battery was produced in the same manner as in Comparative Example 15 except that the alkaline electrolyte contained 0.05% by weight of stannic oxide (tin content 0.039% by weight) as the compound containing the metal element M.

COMPARATIVE EXAMPLE 18

An air zinc battery was produced in the same manner as in Example 52 except that the inner face of the negative electrode case (the surface in contact with the negative electrode) was not plated with tin.

EXAMPLE 60

The inner face of the negative electrode case (the surface in contact with the negative electrode) was plated with indium as a metal element M. Zinc alloy powder containing 0.003% by weight (30 ppm) of aluminum, 0.015% by weight (150 ppm) of bismuth, and 0.05% by weight (500 ppm) of indium was used as the negative electrode active material. The alkaline electrolyte contained 0.05% by weight of indium oxide (indium content 0.041% by weight) as a compound containing the metal element M. An air zinc battery was produced in the same manner as in Example 44 except for these differences.

EXAMPLE 61

An air zinc battery was produced in the same manner as in Example 60 except that the alkaline electrolyte contained indium hydroxide as the compound containing the metal element M and that the indium content was set to 0.035% by weight.

EXAMPLE 62

An air zinc battery was produced in the same manner as in Example 60 except that the alkaline electrolyte contained indium sulfate as the compound containing the metal element M and that the indium content was set to 0.022% by weight.

EXAMPLE 63

An air zinc battery was produced in the same manner as in Example 60 except that the alkaline electrolyte contained indium chloride as the compound containing the metal element M and that the indium content was set to 0.020% by weight.

EXAMPLE 64

An air zinc battery was produced in the same manner as in Example 60 except that the alkaline electrolyte further contained 0.5% by weight of lithium hydroxide.

EXAMPLE 65

An air zinc battery was produced in the same manner as in Example 60 except that the alkaline electrolyte contained indium hydroxide as the compound containing the metal element M and that the alkaline electrolyte further contained 0.5% by weight of lithium hydroxide.

EXAMPLE 66

An air zinc battery was produced in the same manner as in Example 60 except that the alkaline electrolyte contained indium sulfate as the compound containing the metal element M and that the alkaline electrolyte further contained 0.5% by weight of lithium hydroxide.

EXAMPLE 67

An air zinc battery was produced in the same manner as in Example 60 except that the alkaline electrolyte contained indium chloride as the compound containing the metal element M and that the alkaline electrolyte further contained 0.5% by weight of lithium hydroxide.

COMPARATIVE EXAMPLE 19

An air zinc battery was produced in the same manner as in Example 60 except that the alkaline electrolyte did not contain indium as the metal element M.

COMPARATIVE EXAMPLE 20

An air zinc battery was produced in the same manner as in Example 60 except that the inner face of the negative electrode case (the surface in contact with the negative electrode) was plated with tin instead of indium.

Table 7 shows the compositions of the negative electrode active materials of the air zinc batteries thus produced and the compositions of the inner surfaces of the current collectors thereof. Table 8 shows the compositions of the alkaline electrolytes.

TABLE 7

| Battery No. | Zinc alloy (negative electrode active material) | Inner face of negative electrode case |
| --- | --- | --- |
| Example 44 | Al: 0.003 wt % Bi: 0.015 wt % In: 0.05 wt % Cu: 0.005 wt % | Cu |
| Example 45 | Al: 0.003 wt % Bi: 0.015 wt % In: 0.05 wt % Cu: 0.005 wt % | Cu |
| Example 46 | Al: 0.003 wt % Bi: 0.015 wt % In: 0.05 wt % Cu: 0.005 wt % | Cu |
| Example 47 | Al: 0.003 wt % Bi: 0.015 wt % In: 0.05 wt % Cu: 0.005 wt % | Cu |
| Example 48 | Al: 0.003 wt % Bi: 0.015 wt % In: 0.05 wt % Cu: 0.005 wt % | Cu |
| Example 49 | Al: 0.003 wt % Bi: 0.015 wt % In: 0.05 wt % Cu: 0.005 wt % | Cu |
| Example 50 | Al: 0.003 wt % Bi: 0.015 wt % In: 0.05 wt % Cu: 0.005 wt % | Cu |
| Example 51 | Al: 0.003 wt % Bi: 0.015 wt % In: 0.05 wt % Cu: 0.005 wt % | Cu |
| Comp. Example 11 | Al: 0.003 wt % Bi: 0.015 wt % In: 0.05 wt % | Cu |
| Comp. Example 12 | Al: 0.003 wt % Bi: 0.015 wt % In: 0.05 wt % Cu: 0.005 wt % | Cu |
| Comp. Example 13 | Al: 0.003 wt % Bi: 0.015 wt % In: 0.05 wt % | Cu |
| Comp. Example 14 | Al: 0.003 wt % Bi: 0.015 wt % In: 0.05 wt % Cu: 0.005 wt % | Sn |
| Example 52 | Al: 0.003 wt % Bi: 0.015 wt % In: 0.05 wt % Sn: 0.005 wt % | Sn |
| Example 53 | Al: 0.003 wt % Bi: 0.015 wt % In: 0.05 wt % Sn: 0.005 wt % | Sn |
| Example 54 | Al: 0.003 wt % Bi: 0.015 wt % In: 0.05 wt % Sn: 0.005 wt % | Sn |
| Example 55 | Al: 0.003 wt % Bi: 0.015 wt % In: 0.05 wt % Sn: 0.005 wt % | Sn |
| Example 56 | Al: 0.003 wt % Bi: 0.015 wt % In: 0.05 wt % Sn: 0.005 wt % | Sn |
| Example 57 | Al: 0.003 wt % Bi: 0.015 wt % In: 0.05 wt % Sn: 0.005 wt % | Sn |
| Example 58 | Al: 0.003 wt % Bi: 0.015 wt % In: 0.05 wt % Sn: 0.005 wt % | Sn |
| Example 59 | Al: 0.003 wt % Bi: 0.015 wt % In: 0.05 wt % Sn: 0.005 wt % | Sn |
| Comp. Example 15 | Al: 0.003 wt % Bi: 0.015 wt % In: 0.05 wt % | Sn |
| Comp. Example 16 | Al: 0.003 wt % Bi: 0.015 wt % In: 0.05 wt % Sn: 0.005 wt % | Sn |
| Comp. Example 17 | Al: 0.003 wt % Bi: 0.015 wt % In: 0.05 wt % | Sn |
| Comp. Example 18 | Al: 0.003 wt % Bi: 0.015 wt % In: 0.05 wt % Sn: 0.005 wt % | Cu |
| Example 60 | Al: 0.003 wt % Bi: 0.015 wt % In: 0.05 wt % | In |
| Example 61 | Al: 0.003 wt % Bi: 0.015 wt % In: 0.05 wt % | In |
| Example 62 | Al: 0.003 wt % Bi: 0.015 wt % In: 0.05 wt % | In |
| Example 63 | Al: 0.003 wt % Bi: 0.015 wt % In: 0.05 wt % | In |
| Example 64 | Al: 0.003 wt % Bi: 0.015 wt % In: 0.05 wt % | In |
| Example 65 | Al: 0.003 wt % Bi: 0.015 wt % In: 0.05 wt % | In |
| Example 66 | Al: 0.003 wt % Bi: 0.015 wt % In: 0.05 wt % | In |
| Example 67 | Al: 0.003 wt % Bi: 0.015 wt % In: 0.05 wt % | In |
| Comp. Example 19 | Al: 0.003 wt % Bi: 0.015 wt % In: 0.05 wt % | In |
| Comp. Example 20 | Al: 0.003 wt % Bi: 0.015 wt % In: 0.05 wt % | Sn |

TABLE 8

| Battery No. | Alkaline electrolyte |
| --- | --- |
| Example 44 | KOH: 40 wt % ZnO: 3 wt % $Cu_2SO_4$: 0.05 wt % |
| Example 45 | KOH: 40 wt % ZnO: 3 wt % $CuSO_4$: 0.05 wt % |
| Example 46 | KOH: 40 wt % ZnO: 3 wt % CuCl: 0.05 wt % |
| Example 47 | KOH: 40 wt % ZnO: 3 wt % $CuCl_2$: 0.05 wt % |
| Example 48 | KOH: 40 wt % ZnO: 3 wt % $Cu_2SO_4$: 0.05 wt % LiOH: 0.5 wt % |
| Example 49 | KOH: 40 wt % ZnO: 3 wt % $CuSO_4$: 0.05 wt % LiOH: 0.5 wt % |

TABLE 8-continued

| Battery No. | Alkaline electrolyte |
|---|---|
| Example 50 | KOH: 40 wt % ZnO: 3 wt % CuCl: 0.05 wt % LiOH: 0.5 wt % |
| Example 51 | KOH: 40 wt % ZnO: 3 wt % $CuCl_2$: 0.05 wt % LiOH: 0.5 wt % |
| Comp. Example 11 | KOH: 40 wt % ZnO: 3 wt % |
| Comp. Example 12 | KOH: 40 wt % ZnO: 3 wt % |
| Comp. Example 13 | KOH: 40 wt % ZnO: 3 wt % $CuSO_4$: 0.05 wt % |
| Comp. Example 14 | KOH: 40 wt % ZnO: 3 wt % $Cu_2SO_4$: 0.05 wt % |
| Example 52 | KOH: 40 wt % ZnO: 3 wt % SnO: 0.05 wt % |
| Example 53 | KOH: 40 wt % ZnO: 3 wt % $SnO_2$: 0.05 wt % |
| Example 54 | KOH: 40 wt % ZnO: 3 wt % $K_2SnO_3 \cdot 3H_2O$: 0.05 wt % |
| Example 55 | KOH: 40 wt % ZnO: 3 wt % $Na_2SnO_3 \cdot 3H_2O$: 0.05 wt % |
| Example 56 | KOH: 40 wt % ZnO: 3 wt % SnO: 0.05 wt % LiOH: 0.5 wt % |
| Example 57 | KOH: 40 wt % ZnO: 3 wt % $SnO_2$: 0.05 wt % LiOH: 0.5 wt % |
| Example 58 | KOH: 40 wt % ZnO: 3 wt % $K_2SnO_3 \cdot 3H_2O$: 0.05 wt % LiOH: 0.5 wt % |
| Example 59 | KOH: 40 wt % ZnO: 3 wt % $Na_2SnO_3 \cdot 3H_2O$: 0.05 wt % LiOH: 0.5 wt % |
| Comp. Example 15 | KOH: 40 wt % ZnO: 3 wt % |
| Comp. Example 16 | KOH: 40 wt % ZnO: 3 wt % |
| Comp. Example 17 | KOH: 40 wt % ZnO: 3 wt % $SnO_2$: 0.05 wt % |
| Comp. Example 18 | KOH: 40 wt % ZnO: 3 wt % SnO: 0.05 wt % |
| Example 60 | KOH: 40 wt % ZnO: 3 wt % $In_2O_3$: 0.05 wt % |
| Example 61 | KOH: 40 wt % ZnO: 3 wt % $In(OH)_3$: 0.05 wt % |
| Example 62 | KOH: 40 wt % ZnO: 3 wt % $In_2(SO_4)_3$: 0.05 wt % |
| Example 63 | KOH: 40 wt % ZnO: 3 wt % $InCl_3 \cdot 4H_2O$: 0.05 wt % |
| Example 64 | KOH: 40 wt % ZnO: 3 wt % $In_2O_3$: 0.05 wt % LiOH: 0.5 wt % |
| Example 65 | KOH: 40 wt % ZnO: 3 wt % $In(OH)_3$: 0.05 wt % LiOH: 0.5 wt % |
| Example 66 | KOH: 40 wt % ZnO: 3 wt % $In_2(SO_4)_3$: 0.05 wt % LiOH: 0.5 wt % |
| Example 67 | KOH: 40 wt % ZnO: 3 wt % $InCl_3 \cdot 4H_2O$: 0.05 wt % LiOH: 0.5 wt % |
| Comp. Example 19 | KOH: 40 wt % ZnO: 3 wt % |
| Comp. Example 20 | KOH: 40 wt % ZnO: 3 wt % $In_2O_3$: 0.05 wt % |

(Evaluation Test)

The storage characteristics of the batteries of Examples 44 to 67 and Comparative Examples 11 to 20 were evaluated as follows. First, the batteries after the fabrication were stored in a constant temperature environment at 60° C. for 2-weeks with their air vents sealed with seal tape. The batteries were continuously discharged at a constant current of 2 mA and the discharge time it took for the voltage to drop to a cut-off voltage of 0.9 V was measured. Also, the thickness of each battery was measured before and after the storage to evaluate the amount of bulging. To obtain discharge time and the amount of battery bulging due to the storage, the values of three batteries were averaged. Table 9 shows the results.

TABLE 9

| | After 2-week storage at 60° C. | |
|---|---|---|
| Battery No. | 2 mA discharge time (h) | Battery bulging (mm) |
| Example 44 | 243 | 0.09 |
| Example 45 | 255 | 0.08 |
| Example 46 | 238 | 0.03 |
| Example 47 | 261 | 0.03 |
| Example 48 | 278 | 0.03 |
| Example 49 | 284 | 0.03 |
| Example 50 | 278 | 0.04 |
| Example 51 | 284 | 0.03 |
| Comp. Example 11 | 122 | 0.06 |
| Comp. Example 12 | 138 | 0.07 |
| Comp. Example 13 | 162 | 0.03 |
| Comp. Example 14 | 168 | 0.03 |
| Example 52 | 278 | 0.05 |
| Example 53 | 290 | 0.05 |
| Example 54 | 282 | 0.06 |
| Example 55 | 285 | 0.04 |
| Example 56 | 301 | 0.04 |
| Example 57 | 319 | 0.04 |
| Example 58 | 313 | 0.05 |
| Example 59 | 307 | 0.03 |
| Comp. Example 15 | 151 | 0.04 |
| Comp. Example 16 | 168 | 0.06 |
| Comp. Example 17 | 174 | 0.06 |
| Comp. Example 18 | 171 | 0.06 |
| Example 60 | 273 | 0.02 |
| Example 61 | 278 | 0.03 |
| Example 62 | 278 | 0.04 |
| Example 63 | 284 | 0.05 |
| Example 64 | 290 | 0.05 |
| Example 65 | 296 | 0.04 |
| Example 66 | 302 | 0.03 |
| Example 67 | 296 | 0.02 |
| Comp. Example 19 | 168 | 0.05 |
| Comp. Example 20 | 160 | 0.05 |

In the air zinc batteries of Comparative Examples 11 to 13, the inner face of the negative electrode case is copper. In Comparative Example 13, the alkaline electrolyte contains copper as the metal element M. In Comparative Example 12, the negative electrode active material contains copper as the metal element M. In Comparative Example 11, the negative electrode active material and the alkaline electrolyte contain no copper. In this order of Comparative Examples 13, 12, and 11, the 2 mA discharge time after the 2-week storage at 60° C. decreased. In the battery of Comparative Example 14, the inner face of the negative electrode case includes no copper. The 2 mA discharge time of Comparative Example 14 was improved relative to Comparative Examples 11 to 13, but it is not sufficient.

In the batteries of Comparative Examples 15 to 17, the inner face of the negative electrode case is plated with tin. In Comparative Example 17, the alkaline electrolyte contains tin as the metal element M. In Comparative Example 16, the negative electrode active material contains tin. In Comparative Example 15, the negative electrode active material and the alkaline electrolyte contain no tin. In this order of Comparative Examples 17, 16, and 15, the 2 mA discharge time after the 2-week storage at 60° C. decreased. In the battery of Comparative Example 18, the inner face of the negative electrode case includes no tin. This battery also did not provide a sufficient 2 mA discharge time.

In the battery of Comparative Example 19, the inner face of the negative electrode case is plated with indium and the negative electrode active material contains indium as the metal element M. This battery also exhibited a decrease in 2 mA discharge time after the 2-week storage at 60° C. in the same manner as in Comparative Example 12 where the negative electrode case and the negative electrode active material include copper. In the battery of Comparative Example 20, the inner face of the negative electrode case includes no indium. This battery also did not provide a sufficient 2 mA discharge time.

In the batteries of Examples 44 to 47, 52 to 55, and 60 to 63, all of the negative electrode active material, the alkaline electrolyte, and the inner face of the negative electrode case include the metal element M. In Table 9, Examples 44 to 47, 52 to 55, and 60 to 63 had longer discharge times than Comparative Examples 11 to 20. This indicates that when all of the negative electrode active material, the surface of the conductive member (the surface in contact with the negative electrode), and the electrolyte include the metal element M, the storage characteristics are improved.

In the batteries of Examples 48 to 51, 56 to 59, and 64 to 67, all of the negative electrode active material, the alkaline electrolyte, and the inner face of the negative electrode case include the metal element M and the alkaline electrolyte further contains 0.5% by weight of lithium hydroxide. Examples 48 to 51, 56 to 59, and 64 to 67 exhibited longer discharge times than Examples 44 to 47, 52 to 55, and 60 to 63. This indicates that when the alkaline electrolyte contains lithium hydroxide, more favorable storage characteristics can be obtained.

EXAMPLE 68

An air zinc battery was produced in the same manner as in Example 48 except that the lithium hydroxide content in the alkaline electrolyte was set to 0.005% by weight.

EXAMPLE 69

An air zinc battery was produced in the same manner as in Example 48 except that the lithium hydroxide content in the alkaline electrolyte was set to 0.01% by weight.

EXAMPLE 70

An air zinc battery was produced in the same manner as in Example 48 except that the lithium hydroxide content in the alkaline electrolyte was set to 0.05% by weight.

EXAMPLE 71

An air zinc battery was produced in the same manner as in Example 48 except that the lithium hydroxide content in the alkaline electrolyte was set to 0.1% by weight.

EXAMPLE 72

An air zinc battery was produced in the same manner as in Example 48 except that the lithium hydroxide content in the alkaline electrolyte was set to 1.5% by weight.

EXAMPLE 73

An air zinc battery was produced in the same manner as in Example 48 except that the lithium hydroxide content in the alkaline electrolyte was set to 2% by weight.

EXAMPLE 74

An air zinc battery was produced in the same manner as in Example 48 except that the lithium hydroxide content in the alkaline electrolyte was set to 3% by weight.

EXAMPLE 75

An air zinc battery was produced in the same manner as in Example 53 except that the stannic oxide content in the alkaline electrolyte was set to 0.001% by weight (tin content 0.00079% by weight).

EXAMPLE 76

An air zinc battery was produced in the same manner as in Example 53 except that the stannic oxide content in the alkaline electrolyte was set to 0.002% by weight (tin content 0.0016% by weight).

EXAMPLE 77

An air zinc battery was produced in the same manner as in Example 53 except that the stannic oxide content in the alkaline electrolyte was set to 0.005% by weight (tin content 0.0039% by weight).

EXAMPLE 78

An air zinc battery was produced in the same manner as in Example 53 except that the stannic oxide content in the alkaline electrolyte was set to 0.08% by weight (tin content 0.063% by weight).

EXAMPLE 79

An air zinc battery was produced in the same manner as in Example 53 except that the stannic oxide content in the alkaline electrolyte was set to 0.1% by weight (tin content 0.079% by weight).

EXAMPLE 80

An air zinc battery was produced in the same manner as in Example 53 except that the stannic oxide content in the alkaline electrolyte was set to 0.15% by weight (tin content 0.118% by weight).

EXAMPLE 81

An air zinc battery was produced in the same manner as in Example 53 except that the tin (metal element M) content in the negative electrode active material was set to 0.001% by weight (10 ppm).

EXAMPLE 82

An air zinc battery was produced in the same manner as in Example 53 except that the tin (metal element M) content in the negative electrode active material was set to 0.0015% by weight (15 ppm).

EXAMPLE 83

An air zinc battery was produced in the same manner as in Example 53 except that the tin (metal element M) content in the negative electrode active material was set to 0.003% by weight (30 ppm).

EXAMPLE 84

An air zinc battery was produced in the same manner as in Example 53 except that the tin (metal element M) content in the negative electrode active material was set to 0.05% by weight (500 ppm).

EXAMPLE 85

An air zinc battery was produced in the same manner as in Example 53 except that the tin (metal element M) content in the negative electrode active material was set to 0.06% by weight (600 ppm).

EXAMPLE 86

An air zinc battery was produced in the same manner as in Example 53 except that the tin (metal element M) content in the negative electrode active material was set to 0.07% by weight (700 ppm).

Table 10 shows the compositions of the negative electrode active materials of the air zinc batteries thus produced and the compositions of the inner face of the negative electrode case thereof. Table 11 shows the compositions of the alkaline electrolytes.

TABLE 11

| Battery No. | Alkaline electrolyte |
|---|---|
| Example 68 | KOH: 40 wt % ZnO: 3 wt % $Cu_2SO_4$: 0.05 wt % LiOH: 0.005 wt % |
| Example 69 | KOH: 40 wt % ZnO: 3 wt % $Cu_2SO_4$: 0.05 wt % LiOH: 0.01 wt % |
| Example 70 | KOH: 40 wt % ZnO: 3 wt % $Cu_2SO_4$: 0.05 wt % LiOH: 0.05 wt % |
| Example 71 | KOH: 40 wt % ZnO: 3 wt % $Cu_2SO_4$: 0.05 wt % LiOH: 0.1 wt % |
| Example 72 | KOH: 40 wt % ZnO: 3 wt % $Cu_2SO_4$: 0.05 wt % LiOH: 1.5 wt % |
| Example 73 | KOH: 40 wt % ZnO: 3 wt % $Cu_2SO_4$: 0.05 wt % LiOH: 2 wt % |
| Example 74 | KOH: 40 wt % ZnO: 3 wt % $Cu_2SO_4$: 0.05 wt % LiOH: 3 wt % |
| Example 75 | KOH: 40 wt % ZnO: 3 wt % $SnO_2$: 0.001 wt % |
| Example 76 | KOH: 40 wt % ZnO: 3 wt % $SnO_2$: 0.002 wt % |
| Example 77 | KOH: 40 wt % ZnO: 3 wt % $SnO_2$: 0.005 wt % |
| Example 78 | KOH: 40 wt % ZnO: 3 wt % $SnO_2$: 0.08 wt % |
| Example 79 | KOH: 40 wt % ZnO: 3 wt % $SnO_2$: 0.1 wt % |
| Example 80 | KOH: 40 wt % ZnO: 3 wt % $SnO_2$: 0.15 wt % |
| Example 81 | KOH: 40 wt % ZnO: 3 wt % $SnO_2$: 0.05 wt % |
| Example 82 | KOH: 40 wt % ZnO: 3 wt % $SnO_2$: 0.05 wt % |
| Example 83 | KOH: 40 wt % ZnO: 3 wt % $SnO_2$: 0.05 wt % |
| Example 84 | KOH: 40 wt % ZnO: 3 wt % $SnO_2$: 0.05 wt % |
| Example 85 | KOH: 40 wt % ZnO: 3 wt % $SnO_2$: 0.05 wt % |
| Example 86 | KOH: 40 wt % ZnO: 3 wt % $SnO_2$: 0.05 wt % |

The storage characteristics of the air zinc batteries produced in Examples 68 to 86 were evaluated by measuring the 2 mA discharge time and the amount of battery bulging in the same manner as the above. Table 12 shows the measurement results.

TABLE 10

| Battery No. | Zinc alloy (negative electrode active material) | Inner face of negative electrode case |
|---|---|---|
| Example 68 | Al: 0.003 wt % Bi: 0.015 wt % In: 0.05 wt % Cu: 0.005 wt % | Cu |
| Example 69 | Al: 0.003 wt % Bi: 0.015 wt % In: 0.05 wt % Cu: 0.005 wt % | Cu |
| Example 70 | Al: 0.003 wt % Bi: 0.015 wt % In: 0.05 wt % Cu: 0.005 wt % | Cu |
| Example 71 | Al: 0.003 wt % Bi: 0.015 wt % In: 0.05 wt % Cu: 0.005 wt % | Cu |
| Example 72 | Al: 0.003 wt % Bi: 0.015 wt % In: 0.05 wt % Cu: 0.005 wt % | Cu |
| Example 73 | Al: 0.003 wt % Bi: 0.015 wt % In: 0.05 wt % Cu: 0.005 wt % | Cu |
| Example 74 | Al: 0.003 wt % Bi: 0.015 wt % In: 0.05 wt % Cu: 0.005 wt % | Cu |
| Example 75 | Al: 0.003 wt % Bi: 0.015 wt % In: 0.05 wt % Sn: 0.005 wt % | Sn |
| Example 76 | Al: 0.003 wt % Bi: 0.015 wt % In: 0.05 wt % Sn: 0.005 wt % | Sn |
| Example 77 | Al: 0.003 wt % Bi: 0.015 wt % In: 0.05 wt % Sn: 0.005 wt % | Sn |
| Example 78 | Al: 0.003 wt % Bi: 0.015 wt % In: 0.05 wt % Sn: 0.005 wt % | Sn |
| Example 79 | Al: 0.003 wt % Bi: 0.015 wt % In: 0.05 wt % Sn: 0.005 wt % | Sn |
| Example 80 | Al: 0.003 wt % Bi: 0.015 wt % In: 0.05 wt % Sn: 0.005 wt % | Sn |
| Example 81 | Al: 0.003 wt % Bi: 0.015 wt % In: 0.05 wt % Sn: 0.001 wt % | Sn |
| Example 82 | Al: 0.003 wt % Bi: 0.015 wt % In: 0.05 wt % Sn: 0.0015 wt % | Sn |
| Example 83 | Al: 0.003 wt % Bi: 0.015 wt % In: 0.05 wt % Sn: 0.003 wt % | Sn |
| Example 84 | Al: 0.003 wt % Bi: 0.015 wt % In: 0.05 wt % Sn: 0.05 wt % | Sn |
| Example 85 | Al: 0.003 wt % Bi: 0.015 wt % In: 0.05 wt % Sn: 0.06 wt % | Sn |
| Example 86 | Al: 0.003 wt % Bi: 0.015 wt % In: 0.05 wt % Sn: 0.07 wt % | Sn |

TABLE 12

| Battery No. | After 2-week storage at 60° C. | |
|---|---|---|
| | 2 mA discharge time (h) | Battery bulging (mm) |
| Example 68 | 248 | 0.05 |
| Example 69 | 252 | 0.07 |
| Example 70 | 270 | 0.06 |
| Example 71 | 272 | 0.04 |
| Example 72 | 276 | 0.03 |
| Example 73 | 258 | 0.05 |
| Example 74 | 248 | 0.05 |
| Example 75 | 201 | 0.04 |
| Example 76 | 268 | 0.03 |
| Example 77 | 293 | 0.03 |
| Example 78 | 289 | 0.04 |
| Example 79 | 271 | 0.04 |
| Example 80 | 198 | 0.08 |
| Example 81 | 221 | 0.07 |
| Example 82 | 271 | 0.04 |
| Example 83 | 292 | 0.04 |
| Example 84 | 291 | 0.03 |
| Example 85 | 268 | 0.04 |
| Example 86 | 231 | 0.06 |

In the batteries of Examples 68 to 74, all of the negative electrode active material, the alkaline electrolyte, and the inner face of the negative electrode case include copper as the metal element M, the alkaline electrolyte further contains lithium hydroxide, and the lithium hydroxide content is varied. Example 68 with a lithium hydroxide content of 0.005% by weight and Example 74 with a content of 3% by weight exhibited almost the same discharge time as Example 44 including no lithium hydroxide. Thus, there is no influence of the lithium hydroxide contained therein. Example 69 with a lithium hydroxide content of 0.01% by weight and Example 73 with a content of 2% by weight exhibited longer discharge times than Example 44 including no lithium hydroxide. This indicates that when the lithium hydroxide content is 0.01 to 2% by weight, good storage characteristics can be obtained. Further, Examples 70 to 72 exhibited significant increases in 2 mA discharge time after the 2-week storage at 60%. This suggests that the optimum lithium hydroxide content is 0.05 to 1.5% by weight.

In the batteries of Examples 75 to 80, all of the negative electrode active material, the alkaline electrolyte, and the inner face of the negative electrode case include tin as the metal element M and the stannic oxide content (the tin content) in the alkaline electrolyte is varied. Example 75 with a stannic oxide content of 0.001% by weight (tin content of 0.00079% by weight) and Example 80 with a content of 0.15% by weight (tin content of 0.118% by weight) exhibited increases in discharge time relative to Comparative Example 16 with a tin-free electrolyte. On the other hand, Example 76 with a stannic oxide content of 0.002% by weight (tin content of 0.0016% by weight) and Example 79 with a content of 0.1% by weight (tin content of 0.079% by weight) exhibited further increases in discharge time relative to Comparative Example 16. This indicates that when the stannic oxide content is 0.002 to 0.1% by weight (the tin content is 0.0016 to 0.079% by weight), good storage characteristics can be obtained. Further, Examples 77 and 78 exhibited significant increases in discharge time. This suggests that the optimum stannic oxide content is 0.005 to 0.08% by weight (the optimum tin content is 0.0039 to 0.063% by weight).

Also, in the batteries where the alkaline electrolyte contains a compound containing tin other than stannic oxide, for example, stannous oxide, potassium stannate, or sodium stannate, the content thereof was varied. These batteries also produced essentially the same effects in terms of discharge time.

Further, in the batteries where all of the negative electrode active material, the alkaline electrolyte, and the inner face of the negative electrode case include copper as the metal element M, the content of the copper-containing compound (copper content) in the alkaline electrolyte was also varied. These batteries also produced essentially the same effects as the above-mentioned batteries including tin.

Furthermore, in the batteries where all of the negative electrode active material, the alkaline electrolyte, and the inner face of the negative electrode case include indium as the metal element M, the content of the indium-containing compound (indium content) in the alkaline electrolyte was also varied. These batteries also produced essentially the same effects as the above-mentioned batteries including tin.

In the batteries of Examples 81 to 86, all of the negative electrode active material, the alkaline electrolyte, and the inner face of the negative electrode case include tin as the metal element M and the tin content in the negative electrode active material is varied. Example 81 where the negative electrode active material has a tin content of 0.001% by weight (10 ppm) and Example 86 with a content of 0.07% by weight (700 ppm) exhibited increases in discharge time relative to Comparative Example 17 where the negative electrode active material contains no tin. On the other hand, Example 82 where the negative electrode active material has a tin content of 0.0015% by weight (15 ppm) and Example 85 with a content of 0.06% by weight (600 ppm) exhibited further increases in discharge time relative to Comparative Example 17 where the negative electrode active material contains no tin. This indicates that when the tin content in the negative electrode active material is 0.0015 to 0.06% by weight (15 to 600 ppm), good storage characteristics can be obtained. Further, Examples 83 to 84 exhibited significant increases in discharge time. This indicates that the optimum tin content in the negative electrode active material is 0.003 to 0.05% by weight (30 to 500 ppm).

Further, in the batteries where all of the negative electrode active material, the alkaline electrolyte, and the inner face of the negative electrode case include copper as the metal element M, the copper content in the negative electrode active material was varied. These batteries also produced essentially the same effects as the above-mentioned batteries including tin.

Further, in the batteries where all of the negative electrode active material, the alkaline electrolyte, and the inner face of the negative electrode case include indium as the metal element M, the indium content in the negative electrode active material was varied. These batteries also produced essentially the same effects as the above-mentioned batteries including tin.

As described above, when the negative electrode active material, the alkaline electrolyte, and the inner face of the negative electrode case (i.e., conductive member) include the same metal element M, the 2 mA discharge time after the 2-week storage at 60° C. increased. Also, when the alkaline electrolyte further contained lithium hydroxide, the batteries with the above-described configuration provided good storage characteristics. Particularly when the alkaline electrolyte contained tetravalent tin, such batteries provided the most favorable storage characteristics both in Examples 52 to 55 including no lithium hydroxide and in Examples 56 to 59 including lithium hydroxide.

This shows that degradation of discharge characteristics due to storage is also suppressed in air zinc batteries just like alkaline dry batteries.

Also, when such a button battery is stored, hydrogen gas is produced inside the battery, and if the hydrogen gas accumulates, the inner pressure of the battery rises, thereby causing the battery to bulge in the direction of thickness. Thus, by measuring the battery thickness before and after storage and evaluating the amount of bulging, the inner pressures of batteries were compared.

The thicknesses of the batteries of Examples 44 to 86 and Comparative Examples 11 to 20 were measured and no significant difference was found in the thickness values. This suggests that there is no difference in the degree of inner pressure increase of the batteries due to production of hydrogen gas.

The discharge times of Examples 44 to 86 were longer than those of Comparative Examples 11 to 20. This is probably for the following two reasons. In the batteries of Examples 44 to 86, all of the negative electrode active material, the alkaline electrolyte, and the inner face of the negative electrode case include the same metal element M, so that the amount of hydrogen gas produced during the 2-week storage at 60° C. was suppressed.

The above-mentioned battery configuration, that is, the inclusion of the same metal element M in the negative electrode active material, the alkaline electrolyte, and the conductive member, makes it possible to improve the storage characteristics of the alkaline battery.

When the alkaline battery according to the present invention is stored, the amount of hydrogen gas produced inside the battery is suppressed. It is therefore possible to provide an alkaline battery with excellent storage characteristics. Also, since an increase in inner pressure of the battery is suppressed, liquid leakage is highly unlikely to occur. The present invention is useful in alkaline batteries such as alkaline manganese batteries, nickel manganese batteries, silver oxide batteries, air zinc batteries, and nickel zinc batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline battery comprising a positive electrode, a negative electrode, and a conductive member,
   wherein said negative electrode comprises a zinc-containing negative electrode active material and an alkaline electrolyte,
   said alkaline electrolyte comprises a potassium hydroxide aqueous solution,
   said conductive member has a surface layer in contact with said negative electrode,
   said negative electrode active material, said alkaline electrolyte, and said surface layer all comprise the same metal element M, and M is copper or tin,
   said negative electrode active material comprises an alloy containing said metal element M and zinc, and
   said surface layer consists of said metal element M.

2. The alkaline battery in accordance with claim 1, wherein said alkaline electrolyte comprises a potassium hydroxide aqueous solution and a solute dissolved in said potassium hydroxide aqueous solution, and said solute comprises a zinc compound and a compound containing said metal element M.

3. The alkaline battery in accordance with claim 1, wherein the contact surface of said conductive member with said negative electrode is plated with said metal element M.

4. The alkaline battery in accordance with claim 1, wherein the content of said metal element M in said alkaline electrolyte is 0.0016 to 0.079% by weight.

5. The alkaline battery in accordance with claim 1, wherein the content of said metal element M in said negative electrode active material is 0.0015 to 0.06% by weight.

6. The alkaline battery in accordance with claim 2, wherein said solute further comprises a lithium compound, and the content of said lithium compound in said alkaline electrolyte is 0.01 to 2% by weight.

7. An alkaline dry battery comprising: a positive electrode case; a cylindrical positive electrode contained in said positive electrode case, said positive electrode containing manganese dioxide and having a hollow; a negative electrode filled in said hollow; and a negative electrode current collector inserted in said negative electrode,
   wherein said negative electrode comprises a zinc-containing negative electrode active material and an alkaline electrolyte,
   said alkaline electrolyte comprises a potassium hydroxide aqueous solution,
   said negative electrode current collector has a surface layer in contact with said negative electrode,
   said negative electrode active material, said alkaline electrolyte, and said surface layer all comprise the same metal element M, and M is copper or tin,
   said negative electrode active material comprises an alloy containing said metal element M and zinc, and
   said surface layer consists of said metal element M.

8. An air zinc battery comprising: a negative electrode case; a negative electrode contained in said negative electrode case; and an air electrode opposing said negative electrode,
   wherein said negative electrode comprises a zinc-containing negative electrode active material and an alkaline electrolyte,
   said alkaline electrolyte comprises a potassium hydroxide aqueous solution,
   said negative electrode case has a surface layer in contact with said negative electrode,
   said negative electrode active material, said alkaline electrolyte, and said surface layer all comprise the same metal element M, and M is copper or tin,
   said negative electrode active material comprises an alloy containing said metal element M and zinc, and
   said surface layer consists of said metal element M.

9. A method for producing an alkaline battery comprising the steps of:
   preparing an alkaline electrolyte that comprises a potassium hydroxide aqueous solution;
   preparing a negative electrode material mixture that comprises a gelling agent and a negative electrode active material, said negative electrode active material comprising an alloy containing zinc and a metal element M, and M is copper or tin;
   mixing said alkaline electrolyte with said negative electrode material mixture to obtain a gelled negative electrode; and bringing a surface layer consisting of said metal element M of a conductive member into contact with said negative electrode, wherein said step of preparing the alkaline electrolyte comprises a step of mixing a potassium hydroxide aqueous solution with a solute to dissolve said solute, and said solute comprises a zinc compound and a compound containing said metal element M.

10. The method for producing an alkaline battery in accordance with claim 9, wherein said solute further comprises a lithium compound.

* * * * *